(12) United States Patent
Cesarini et al.

(10) Patent No.: US 8,285,642 B2
(45) Date of Patent: Oct. 9, 2012

(54) TECHNOLOGY AGNOSTIC UNIVERSALLY APPLICABLE DATA MODEL FOR A TELECOMMUNICATION SERVICE PROVIDER ARCHITECTURE

(75) Inventors: Andrea Cesarini, Rome (IT); Adriano Ottavi, San Mariano (IT); Stefano Renzo Gandini, Cannes (FR)

(73) Assignee: Accenture Global Services Limited, Dublin (IE)

( * ) Notice: Subject to any disclaimer, the term of this patent is extended or adjusted under 35 U.S.C. 154(b) by 1296 days.

(21) Appl. No.: 12/018,784

(22) Filed: Jan. 23, 2008

(65) Prior Publication Data

US 2009/0094112 A1 Apr. 9, 2009

(30) Foreign Application Priority Data

Oct. 3, 2007 (EP) .................................... 07425617

(51) Int. Cl.
*G06Q 40/00* (2006.01)
*G06F 7/00* (2006.01)
(52) U.S. Cl. ......................................... 705/40; 707/790
(58) Field of Classification Search ................... 705/35, 705/40, 400, 402, 409, 412; 707/790–793, 707/802–805; 379/111, 114, 121; 725/1–8
See application file for complete search history.

(56) References Cited

U.S. PATENT DOCUMENTS

| 6,185,576 | B1 * | 2/2001 | McIntosh ............................... 1/1 |
| 7,774,388 | B1 * | 8/2010 | Runchey ........................ 707/811 |
| 2001/0034627 | A1 | 10/2001 | Curtis et al. |
| 2002/0140741 | A1 | 10/2002 | Felky et al. |
| 2004/0015366 | A1 | 1/2004 | Wiseman et al. .................. 705/1 |
| 2005/0091663 | A1 | 4/2005 | Bagsby et al. |

OTHER PUBLICATIONS

European Search Report in EPO Application No. EP 07 42 5617 dated Apr. 18, 2008, 5 pages.

* cited by examiner

*Primary Examiner* — Mary Cheung
(74) *Attorney, Agent, or Firm* — Brinks Hofer Gilson & Lione

(57) ABSTRACT

An implementation foundation for a telecommunication service provider provides an efficient, robust, and reliable cornerstone for any new telecommunication service provider architecture. The implementation foundation includes a universally applicable data model that encodes the fundamental entities of interest to telecommunications service providers. The data model is free of constraints on any particular technology, and provides a reusable foundation for implementing new telecommunication service providers. The data model is composed of business entities that technically support business processes for a telecommunication service provider. As a result, new telecommunication service providers may be implemented in a rapid manner on a proven foundation, without complex and unwieldy customized technologies that rely on immensely complicated point-to-point message connections.

18 Claims, 11 Drawing Sheets

TECHNOLOGY AGNOSTIC UNIVERSALLY APPLICABLE DATA MODEL FOR A TELECOMMUNICATION SERVICE PROVIDER ARCHITECTURE

RELATED APPLICATIONS

This application claims the benefit of priority to EP Patent Application No. 07425617.3, filed Oct. 3, 2007.

BACKGROUND

1. Technical Field

This application relates to a foundational data model and a telecommunication service provider architecture built on the foundational data model.

2. Related Art

The telecommunications industry continues to face demands for more services, and rapid deployment of new services, while the complexity of the underlying technologies providing the services continues to increase. Multiple support systems communicate through a complex web of connections to define, implement, and support the services for both residential and commercial customers. The crucial role of the architecture underlying the service provider is evident in that in the multi-billion dollar telecommunications industry, consumers assess service providers based on the number of available services, the reliability of the services, and the ability of the service provider to respond to customer requests for additional services and for troubleshooting existing services.

Building an architecture for a new telecommunication service provider involves many complex and technical details, and often results in custom, complex, and hard to maintain architectures. In the past, the architectures often used customized point-to-point connections between multiple support systems. The point-to-point connections created a tangled web of unique communication channels that created immense challenges to implement, maintain, and upgrade. Unfortunately, the complexity of the products and services lead to further technical challenges in implementing a new telecommunications architecture that was efficient, flexible, and reliable.

One of the significant complexities lies in finding a way to allow the multiple support systems to communicate with one another. Thus, the technical challenges include providing robust and dynamic communication that provides efficient and elegant service request orchestration and message passing. The already immense number of products, services, and support systems greatly increase the burden of finding a universally applicable solution to these challenges.

A need has long existed for a technology agnostic universally applicable data model foundation to implement a telecommunication service provider architecture.

SUMMARY

A proven foundation for a telecommunication service provider architecture allows rapid implementation, without complex and unwieldy customized technologies that rely, for example, on immensely complicated point-to-point message connections. The proven foundation includes a data model that provides an efficient, robust, and reliable cornerstone for any new telecommunication service provider architecture. The data model is universally applicable and encodes the fundamental entities of interest to telecommunications service providers. The data model is free of constraints on any particular technology, and provides a reusable foundation for implementing new telecommunication service providers. The data model is composed of business entities that are crucial in order to support business processes for a Telecommunication Service Provider.

The data model includes a customer and billing account layer, an order and asset layer, and a product/service catalog layer. The customer and billing account layer includes an organization entity encoding a partition of a customer base into multiple organizations that customers may belong to, a customer entity encoding business customers that purchase offered products and services, and an address entity encoding addresses for the customers. The customer and billing account layer further includes a billing account entity encoding specific billing account entities to which the offered products and services belong, a service account entity encoding provisioning location information for the offered products and services, a contact entity encoding contact information for the customers, a user contact entity encoding contact information for a user of the products and services purchased by the customer, a billing profile entity encoding invoice generation information for the customers, a payment data entity encoding payment parameters selected by the customers, a refill entity encoding a refill request that a customer makes on a prepaid product or service; and, an adjustment entity encoding a pre-paid adjustment or a post-paid adjustment.

The order and asset layer may be divided into a separate order layer and a separate asset layer. The order layer may include an order aggregation entity encoding aggregations of order line items. Each order line item represents instances of bundles, offers, products and services along with promotions ordered by a customer. Line item instantiating products and services may include technical service parameters for provisioning the products and services. The order layer may also include attribute asset entities encoding instantiations of product attributes for the ordered products and services, and an event source entity encoding service usage identification for pay-by-use customers. The order layer also includes a service order response entity encoding an acknowledgment that an order has been fulfilled.

The asset layer includes an asset aggregation entity encoding aggregations of an asset line item. Each asset line item represents the instances of bundles, offers, products and services including promotions ordered by a customer that have been activated successfully by a provisioning system. In some instances, an order line item may not be an asset line item. For example, some telecommunication services providers do not consider an initiation charge for service as an asset. Converting an order line item to an asset line item may be performed by a configured CRM system. Line item instantiation of products and services may further include technical service parameters used in provisioning them as well as an attribute instance entity encoding instantiations of product attributes for the ordered products and services, and an event source entity encoding service usage identification for pay-by-use customers.

The product/service catalog layer includes a promotion entity encoding the promotion of bundles, offers, or products and services, a bundle entity encoding the bundle of offers or products and services offered to the customer, an offer entity encoding the offered products and services offered to the customers, and, a product/service attribute entity encoding supplemental parameters for implementing the offered products and services. In addition, one-to-one, one-to-many, and many-to-many relationships are established between the entities as described below. For example, a bundle, offering, and a product may be implemented by a recursive relationship of the product and service entity.

The promotion entity represents an encoding of an option to modify the price of bundles, offers, products/services when particular condition are reached by a customer or billing account. The bundle entity allows aggregating several offers and or products/services with a price that is less than the sum of a single price of each bundle component. The offer entity aggregates products/services with a price that is less than the sum of the charge of each offer component. The promotion entity, the bundle entity, and the offer entity may each be characterized by a duration of validity from the starting of a due date.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of innovations will be described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

Figure 1:
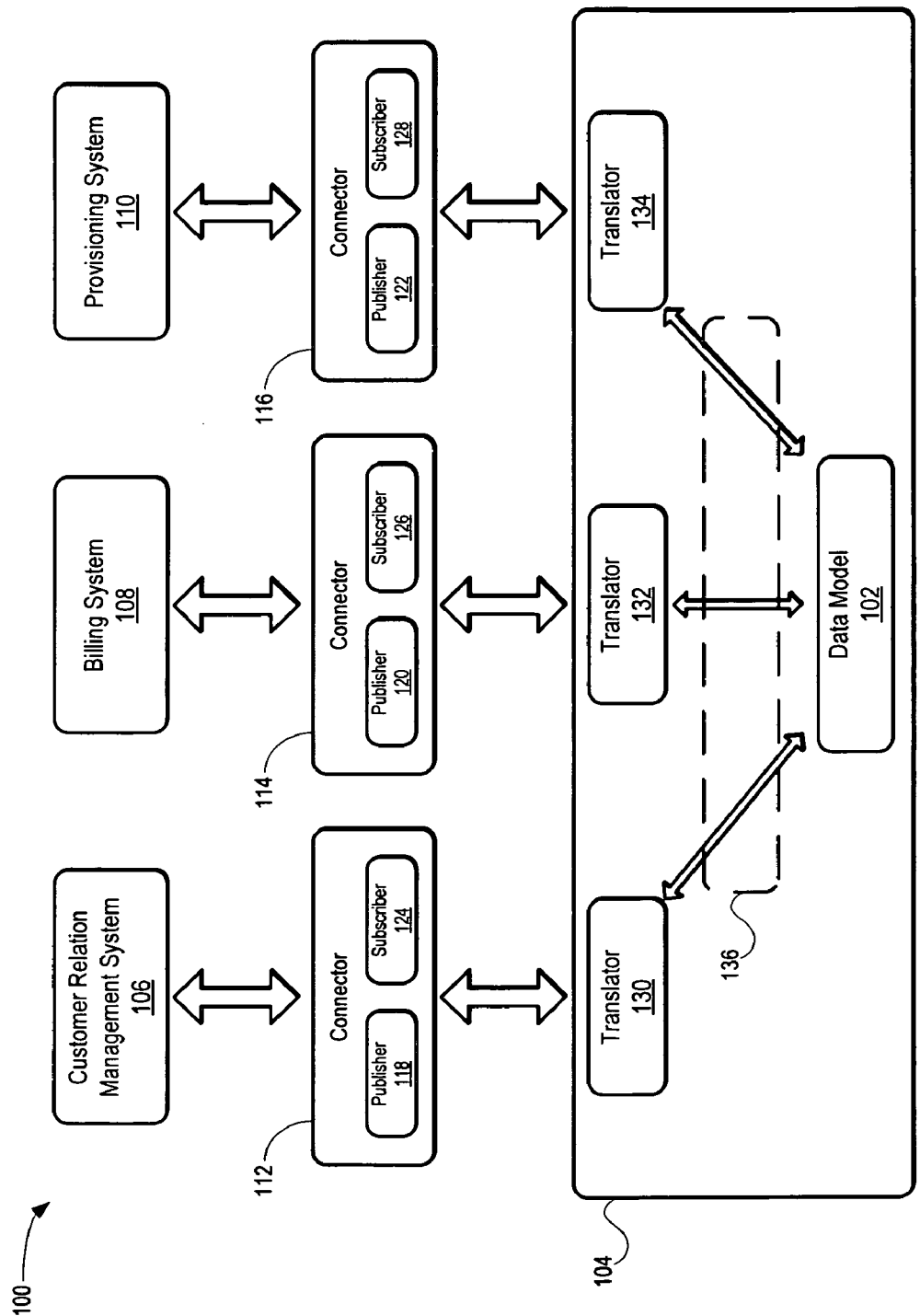
FIG. 1 shows a telecommunication service provider architecture that includes the technology agnostic universally applicable data model.

FIG. 1 shows a telecommunication service provider architecture 100 that includes a technology agnostic universally applicable data model 102 ("data model 102"). The telecommunication service provider architecture 100 may be organized as a Service Oriented Architecture (SOA). However, the data model 102 is technology agnostic such that the data model 102 is universally applicable to any set of hardware or software implementations. For example, the data model 102 is not limited to implementation in a service oriented architecture, but may be implemented in any architecture. A service may be a unit of work done by a service provider to achieve desired end results for a service consumer. Both provider and consumer are roles played by software agents, such as enterprise applications, on behalf of their owners. The services are self-contained and do not depend on the context or state of the other service. The enterprise applications may communicate with each other in a distributed system architecture where the enterprise applications are deployed at different locations in a network within or outside an enterprise. The enterprise applications may communicate through well-established protocols such as Web Services, Messaging, or Remote Method Invocation ("RMI").

The telecommunication service provider architecture 100 includes one or more enterprise applications 106-110 to provide services according to the SOA paradigm. An enterprise service bus 104 may connect the enterprise applications 106-110. For example, the enterprise service bus 104 may connect a customer relation management system 106, a billing system 108, a provisioning system 110, or other systems, that provide service. In one implementation, the customer relation management system 106 is Oracle® Siebel® CRM, available from the Oracle® Corporation, located in Redwood Shores, Calif. The billing system 108 may be Oracle® Billing, also available from the Oracle® Corporation. The provision system 110 may be Tertio available from Evolving Systems®, Inc., located in Englewood, Colo. More than one type of system, such as multiple billing systems, may also be connected to the enterprise service bus 104. For example, another billing system, such as Kenan® FX, available from Comverse® Technology, Inc., located in Wakefield, Mass., may also be connected to the enterprise service bus 104. Other systems, such as Singl.eView® from Independent Technology Systems Ltd. of Surrey, United Kingdom or Infinys® from Convergys CMG Utah Inc. of South Jordan, Utah may also be connected.

The enterprise service bus 104 facilitates communication and interaction among the enterprise applications 106-110. The enterprise service bus 104 uses one or more connectors 130-134 to communicate with each of the various enterprise applications 106-110. A connector may be a multi-layered software communication channel tailored to a specific enterprise application.

The enterprise service bus 104 is implemented as a distributed collection of software components that interact helping the enterprise applications to seamlessly and easily share information in the form of "business entities." In general, a business entity may represent one or more objects usable by one or more of the enterprise applications 106-110 in communication with the enterprise service bus 104. The enterprise service bus 104 facilitates exchange of business entity instances among enterprise applications 106-110, for example, by translating, or transforming, business entities from one proprietary format into another, via the data model 102. In one implementation, the enterprise service bus 104 is the BEA Aqualogic® Service Bus, available from BEA® Systems, Inc., located in San Jose, Calif.

The enterprise applications 106-110 are connected to the enterprise service bus 104 using connectors 112-116. The connectors 112-116 represent the channels for communicating between the enterprise service bus 104 and the enterprise applications 106-110. Each of the connectors 112-116 have two different types of connectors to communicate with each separate application: a publisher connector 118-122, which publishes a business entity from a publishing application to the enterprise service bus 104, and a subscribing connector 124-128 which receives a business entity from the enterprise service bus 104 (pushed by a publisher connector 118-122) into the subscribing application connector.

Each of the connectors 112-116 may be implemented as Java classes or by extending with custom language code pre-built connectors from software vendors. The publisher connectors 118-122 and subscriber connectors 124-128 may be implemented in Web Services Description Language ("WSDL"), an XML-based service description on how to communicate using web services. In general, WSDL defines services as collections of network endpoints, or ports. The WSDL specification provides an XML format for documents for this purpose. The publisher connectors 118-122 and subscriber connectors 124-128 may be implemented in other computer programming languages as well, such as the C computer programming language.

Each of the connectors 112-116 are connected with a translator 130-134. When a business entity is published by an enterprise application 106-110, the translators 130-134 are configured to translate the business entity into the common data model format according to transformation rules 136. Similarly, when an enterprise application 106-110 subscribes to a business entity, the translators 130-134 are configured to translate the business entity from the common data model format into the enterprise application specific format according to transformation rules 136. In general, a transformer rule is an algorithm that converts between the message formats to disparate applications. A transformation rule may list the fields of the messages of the enterprise applications 106-110 and describes how each of the fields are related to the data model 102. The translators 130-134 may translate business entities published by the publisher connectors 118-122 using XSLT, an XML-based language used for the transformation of XML documents into other XML or "human-readable" documents. In one implementation, the translators 130-134 are implemented as Extensible Stylesheet Language Transformations ("XSLT") files and XML Path Language ("XPath") queries containers.

The data model 102 is a logical data model that defines the data information in a typical telecommunication service provider. The data model 102 provides a common dictionary to exchange information among the enterprise applications 106-110 within the telecommunication service provider architecture 100 enabling a streamlined integration of the enterprise applications 106-110. The data model 102 acts as a common language that mediates data entity representation among the various enterprise applications 106-110. The data model 102 provides with the business entities required to perform and orchestrate business processes across the telecommunication service provider architecture.

In general, the enterprise applications 106-110 may have different ways to model basic operational entities that are common in the communications industry. Examples of operational entities include customer, product, service, order, and other operational entities. Thus, each enterprise application 106-110 may have difficulty communicating the same object entity to one another. Accordingly, the data model 102 facilitates easy and streamlined integration of different enterprise applications into an overall architecture.

The data model 102 acts as an intermediate data format for all translations related to a data type and without needing the traditional point-to-point, single translation interface. Translations from a source enterprise application to a target enterprise application via the data model 102 are performed by the translators 130-134.

The data model 102 contains a data representation each of the entity objects required by the enterprise applications 106-110. For each of these objects there are a number of operations that may be performed depending on the nature of the data. An example of an operation performable on an object entity is changing the address of a customer.

In general, each object entity metadata structure is defined as a data structure in the language/format specific for an enterprise application 106-110. This structure encapsulates a representative super set of all systems within the integration solution that use that data. In other words, the common data model object metadata is an aggregation of the data that each enterprise application 106-110 presents to external systems via the connectors 112-116. In accordance with the SOA paradigm, the data model 102 may also be service oriented. As a service is defined once for the entire telecommunication service provider architecture 100, the entities are also defined by the data model 102 in a univocal way for all the enterprise applications 106-110.

As a course-grained service may orchestrate internally one or more fine-grained services, in a similar SOA approach, an entity of the data model 102 may include minor entities. For example, a customer object entity may contain a contact and a service account entity. In implementing the data model 102, the entities of the data model 102 definitions may be defined using an XML Schema Definition.

Accordingly, the data model 102 and the enterprise service bus 104 provide a framework that facilitates a first enterprise application, upon having a business entity created or otherwise occur locally (such as the creation of a new customer account), to publish the entity to a communication channel, and have the entity converted to a common format (i.e., the common data model format). At that point, any other enterprise application connected to the enterprise service bus 104 may subscribe to the business entity. As part of the retrieval process, a translator 130-134 converts the entity from the common data model format into the format used by the subscribing application according to the transformation rules 136. The subscribing application may then undertake its own local action responsive to, or otherwise appropriate for, the business entity generated by the first application.

Figure 2:
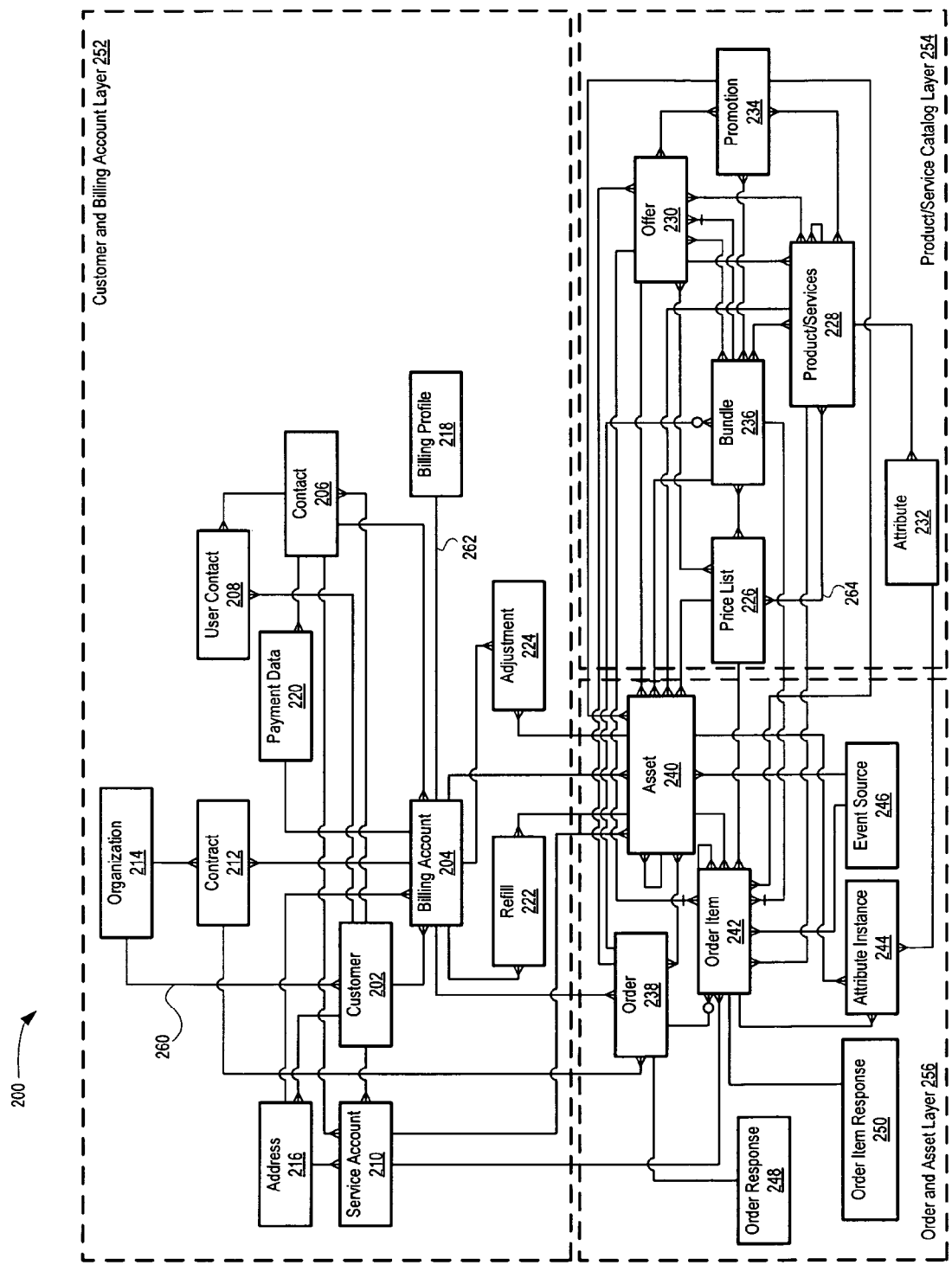
FIG. 2 shows an entity relationship diagram for the data model.

FIG. 2 shows an entity relationship diagram 200 for the data model 102. The entity relationship diagram 200 shows that the data model 102 is implemented according to three layers: a customer and billing account layer 252, a product/service catalog layer 254, and an order and asset layer 256.

In one implementation, the layers 252-256 include entities 202-250. For example, the customer and billing account layer 252 may include a customer entity 202 encoding business customers that purchase offered products and services; a billing account entity 204 encoding specific billing account entities to which the offered products and services belong; a contact entity 206 encoding contact information for the customers; a user contact entity 208 encoding contact information for a customer that purchased a product to provision; a service account entity 210 encoding provisioning location information for the offered products and services; a contract entity 212 encoding service agreements between the telecommunication service provider and the customers; an organization entity 214 encoding a partition of a customer base into multiple organizations that customers may belong to; an address entity 216 encoding addresses for the customers; a billing profile entity 218 encoding invoice generation information for the customers; a payment data entity 220 encoding payment parameters selected by the customers; a refill entity 222 encoding a refill request that a customer makes on a prepaid product or service; and, an adjustment entity 224 encoding a pre-paid adjustment or a post-paid adjustment.

The product/service catalog layer 254 may have multiple entities. For example, the product/service catalog layer 254 may have a price list entity 226 encoding bundle offer product and service prices for the offered products and services; a bundle entity 236 encoding the bundle of products and services offered to the customer; a product/service offering entity 228 encoding the offered products and services offered to the customers; an offer price entity 230 encoding market prices for the offered products and services; and a product/service attribute entity 232 encoding supplemental parameters for implementing the offered products and services.

In addition, the order and asset layer 256 may also have multiple entities. For example, the order and asset layer 256 may have an order aggregation entity 238 encoding aggregations of ordered products and services; an asset entity 240 encoding instantiations of the ordered products and services; an order item entity 242 encoding technical service parameters for provisioning the ordered products and services; an attribute instance entity 244 encoding instantiations of product attributes for the ordered products and services; an event source entity 246 encoding service usage identification for pay-by-use customers; a service order response entity 248 encoding an acknowledgment that an order has been fulfilled; and, an order item response entity 250 encoding a notice that an order item has been provisioned or activated.

The data model 102 may also define one or more relationships between the business entities 202-250. These relationships may include one-to-many relationships, one-to-one relationships, and many-to-many relationships. For example, the data model 102 may define a one-to-many relationship 260 between the organization entity 214 and the customer entity 202. As another example, the data model 102 may define an individual relationship 262 from the billing account entity 204 to the billing profile entity 218. In a further example, the data model 102 may define a many-to-many relationship 264, such as from the product/service offering entity 244 to the price list entity 226. Other relationships between other entities are also possible.

In one implementation, the data model 102 defines the customer entity 202 as the parent for one or more billing accounts and a billing account entity 204 as the parent for one or more products. A customer care application (not shown) may implement this customer/account/product hierarchy, and this hierarchy may be replicated in a billing system to streamline the integration of processes and information flows across the enterprise and to provide a common and convergent view of the customer across different networks, operational procedures and applications. A customer entity 202 may be a top entity; for example, a customer entity 202 may represent individuals or a corporation, acting as the grouping entity for the underlying billing account and product hierarchy. Billing account entities 204 are the entities invoiced by a billing system. A billing account entity 204 represents the accounting entity to which products and services belong, for which charges are accrued and to which payments and adjustments are accounted. As part of this hierarchy, products are the purchasable entities. Each product is associated with a set of parameters used to distinguish the product from the enterprise-to-enterprise perspective.

Each of the business entities 202-250 may have a header. In general, a header contains AI internal information. The header may keep trace of a business event status and to determine messaging event routing. A header may have multiple attributes, defined below in Table 1.

TABLE 1

| Attribute Name | Short Description | Type | Additional Information |
| --- | --- | --- | --- |
| CustomerCode | Identification number for the Customer. It may be the Customer code in a CRM system. | String | A customer code is used by the AI to handle the flow of events related to the same Customer with the correct sequence. |
| OrganizationCode | Organization code. | String | The OrganizationCode identifies the Organization the Customer belongs to. Together with the Customer Code it gives a unique key to identify the customer account, and together with the Account Code it gives a unique key to identify the billing account. |
| BEName | Business event name. Each schema has its own default name. | String | It is used to identify the Business Events and may have one of the following values:<br>CUSTOMERCREATE<br>CUSTOMERMODIFYGENERALDATA<br>CUSTOMERMODIFYFISCALADDRESS<br>ACCOUNTCREATE<br>ACCOUNTMODIFYGENERALDATA<br>ACCOUNTMODIFYBILLINGPROFILE |

TABLE 1-continued

| Attribute Name | Short Description | Type | Additional Information |
|---|---|---|---|
| | | | ACCOUNTMODIFYBILLTOPERSON<br>ACCOUNTMODIFYBILLTOADDRESS<br>ACCOUNTMODIFYPAYMENTDATA<br>SERVICEORDERPROVISIONING<br>SERVICEORDERPROVISIONINGRESPONSE<br>ASSETCOMPONENT<br>PREPADJUSTMENT<br>POSTPAIDADJSUTMENT<br>REFILL |
| ExecState | ExecState is updated before the execution of an action. For example, the status "Billing" means Event before entering Billing process Possible values for this field include:<br>Initial<br>"before system to process"<br>Completed | String | ExecState gives the current status of execution for a Business Event. In the event of an error, if the ExecState is for example "Billing", this means that the error occurred inside the billing system.<br>Possible values include:<br>INITIAL<br>BILLING<br>ERP<br>PROVISIONING<br>COMPLETED<br>CCARE |
| BEInstanceId | Unique ID for the message. BEInstanceID is assigned by a Dispatcher and it does not change during the whole processing of the Business Event. | String | BEInstanceID is an identifier of a message that is used during the processing of a message to recognize and distinguish it from all other messages. |
| ReceivedDate | ReceivedDate is set when the Business Event enters the AI. | Date | Each time a message is received by the application integration layer, the message is assigned a 'Receive Date' that may be used while processing the message to understand the exact date and time when the message was received. |

The customer entity 202 is a business entity of the data model 102 and the customer entity 202 may represent an individual or a company that purchases products and services from the telecommunications service provider. The customer entity 202 may represent residential customers, such as individuals, or business customers, such as a corporation. The customer entity 202 may also act as a grouping entity for an underlying billing account hierarchy. A customer may own a single account or may spread his or her purchases into several accounts. In one implementation, the customer entity 202 has relationships with six other entities: the billing account entity 204, the contact entity 206, the user contact entity 208, the service account entity 210, the organization entity 214, and the address entity 216.

A customer entity 202 may have multiple attributes, defined below in Table 2.

TABLE 2

| Attribute Name | Short Description | Type | Additional Information |
|---|---|---|---|
| FirstName | The first name of a person. | String | FirstName may be populated when the customer is a physical person (i.e., PhyFlag = Y). |
| CustomerCode | Customer code. | String | The customer code may be unique for all systems. The customer code may be 10 digits: the first digit from the Organization Code, and the last two digits are 00 and the other are generated in sequence, e.g., 1XXXXXXX00. |
| AcquisitionDate | Customer since date. | String | Registration Data of a customer for a customer care system. |
| PhyFlag | Flag Physica/Juridical. | String | Possible values for PhyFlag include:<br>Y - Physical<br>N - Juridical<br>This flag is used to identify an individual customer from a Company customer.<br>For an individual, the "Name" field may be present and the field "PersonalID" contains the personal fiscal number.<br>For a company, the "Name" field may be null and the field "PersonalID" contains the VAT account. |
| Language | Language code. | String | Language is the language of the customer used by the CRM to contact the customer. |
| PersonalID | Fiscal number. | String | If physical is set, PersonalID represents the SSN in the US, Fiscal Code in Italy, and so forth.<br>If juridical, PersonalID represents the VAT Code of the Company, such as the SSN in the US, the Fiscal Code in Italy, and so forth. |

TABLE 2-continued

| Attribute Name | Short Description | Type | Additional Information |
|---|---|---|---|
| Email | Principal e-mail address. | String | N/A. |
| FaxNum | Principal facsimile number. | String | N/A. |
| PhoneNum | Principal phone number. | String | N/A. |
| MSegment | Market segment. | String | Possible values for MSegment include:<br>100 - Residential<br>101 - Business |
| Name | Last name if customer is individual/company. Name if the customer is juridical. | String | Name may be truncated at the 40th character. |
| LastUpdateDate | Date of the last update. | String | This attribute retains the date of the last update of the record. |
| StatusCode | N/A. | String | This attribute retains status codes for the customer. |
| StatusDescr | N/A. | String | This attribute retains a description of the status for the customer. |

The billing account entity 204 represents the business entities invoiced by a billing system. A billing account entity 204 represents the accounting entity to which products and services belongs, for which charges are accrued and to which payments and adjustments are accounted. The billing account entity 204 may contain the following supersets of information relevant to business and billing perspectives:

Bill to Person: A contact entity 206 containing information about the person that is going to receive the invoice;

Bill to Address: An address entity 216 representing the address of where the invoice will be sent;

Payer: an entity representing the person paying the invoice;

Billing Profile: an entity containing information such as payment method, bill frequency and bill type; and, Payment Data: an entity containing information detail about a payment method chosen by the payer, such as credit card data or payment by bank account details.

The billing account entity 204 may have the attributes defined below in Table 3.

TABLE 3

| Attribute Name | Short Description | Type | Additional Information |
|---|---|---|---|
| CustomerCode | Customer code. | String | The customer code may be unique for all systems. The customer code may be 10 digits: the first digit from the Organization Code, and the last two digits are 00 and the other are generated in sequence, e.g., 1XXXXXXX00. |
| BillAccountCode | Billing account identifier. | String | The account code may be unique for all systems and is linked to Customer Code. The account code may be 10 digits the first 8 digit are equal to customer code digits, while the last two digits vary from 01 to 99, e.g., 1XXXXXXXnn. |
| BillStartDate | Account start date. | String | N/A. |
| BillStatusChangeReas | Termination reason. | String | Empty on Create operations.<br>Used during termination operations. |
| BillStatusCode | Account status code. | String | Possible values include:<br>"70" for Pending<br>"90" for Active<br>"100" for Acquired<br>For orders creation, the Active status may be permitted. |
| CurrencyCode | Currency code. | String | CurrencyCode represents the invoice currency. |
| Language | Language code. | String | The billing account language may control which template and item labels are to be used in the bill. |
| LastUpdateDate | Date of the last update. | String | N/A. |
| TaxType | V.A.T. Type. | String | The CRM system exports two different tax types: a Standard tax (e.g. 20%) and a Tax Exempt (0%). It is possible to map these different taxations on the billing system and apply different rules regarding taxation methods (e.g. taxation behavior on tax change, rounding method, etc.). May support different flat tax rates. Tax rate may be applied to the total invoiced amount. |
| AccountType | Account type. | String | Informs whether a Billing Account is Prepaid or Postpaid |
| CreditClass | Values: gold, silver, bronze. | String | CreditClass is used for handling the dunning (the process of communicating with customers to insure the collection of accounts receivable) on the Enterprise Resource Planning system. |
| CreditLimit | Credit limit. | String | CreditLimit is used in between two bill cycles to check that customers do not reach their credit limit. |

TABLE 3-continued

| Attribute Name | Short Description | Type | Additional Information |
|---|---|---|---|
| AccountDunning | Dunning is the process of methodically communicating with customers to insure the collection of accounts receivable. | String | AccountDunning may be a flag representing Yes or No. |

The data model 102 may use the contact entity 206 to represent an individual. The contact entity 206 may have different meanings different meaning depending on the associated entity:

Customer Contact: personal information about the customer (e.g., Name, Last Name, e-mail, phone, or other contact information);

Service Account Contact: personal information about the person to contact at a specific site where services are installed;

Bill to Person: personal information about the person that receives the invoice; or, Payer: information about the person paying the invoice.

The contact entity 206 has multiple attributes shown in Table 4 below.

or other information. The service account entity 210 may also contain the following superset of information:

Installation site: An address entity 216 containing information about the location where to install the service purchased by a customer; and, Installation contact: A contact entity 206 representing the person to contact at the installation site.

The attributes included in a service account entity 210 are shown in Table 6 below.

TABLE 4

| Attribute Name | Short Description | Type | Additional Information |
|---|---|---|---|
| ID | ID. | String | Used in service order provisioning. |
| PrimaryContactId | Primary contact ID. | String | Used in Service Order Provisioning. |
| ContactEmail | E-mail of the addressee of the billing invoice. | String | N/A. |
| ContFirstName | First name of the addressee of the billing invoice. | String | N/A. |
| ContLastName | Last name of the addressee of the billing invoice. | String | N/A. |
| ContactTitle | Title of the addressee of the billing invoice. | String | N/A. |
| ContactWorkPhone | Phone number of the addressee of the billing invoice. | String | N/A. |
| ContactPhone | Phone number of the addressee of the billing invoice. | String | N/A. |

A user contact entity 208 includes contact information about a customer that purchased a product to provision. The attributes for a user contact entity 208 are shown in Table 5 below.

TABLE 5

| Attribute Name | Short Description | Type | Additional Information |
|---|---|---|---|
| ContactId | Identifier of the user contact. | String | Represents a user contact identification for a product. |
| ContactEmailAddress | User contact e-mail. | String | User contact e-mail for the product. |
| ContactFirstName | User contact first name. | String | User contact first name for the product. |
| ContactLastName | User contact last name. | String | User contact last name for the product. |
| ContactGender | User contact gender. | String | User contact gender for the product. |
| ContactWorkPhone | User contact work phone. | String | User contact work phone for the product. |

The service account entity 210 may be a business entity representing information related to a site where a service enabling the product and the offering purchased by the customer should be provisioned. The service account entity 210 may also represent the address and the contact of a customer and may be used to assign a contact and an address to a specific product or service. The service account entity 210 may include technical information, site address, site contact,

TABLE 6

| Attribute Name | Short Description | Type | Additional Information |
|---|---|---|---|
| ListOfAddress | List of addressentities. | String | This attribute stores one or more address entities. |
| ListOfContact | List of contact entities. | String | This attribute stores one or more contact entities. |

In one implementation of the data model 102, the contract entity 212 is a business entity representing the agreement between the telecommunication service provider and a customer. The contract entity 212 links the services and products purchased by the customer to billing accounts. The contract entity 212 also defines the terms and condition between the two parties in case the agreement is not respected, such as including penalties incurred by the customer in case of early termination of the subscription to the service provided by the telecommunication service provider. The attributes of a contract entity 212 are listed below in Table 7.

TABLE 7

| Attribute Name | Short Description | Type |
| --- | --- | --- |
| Account Name | The name of the account. | String |
| Account ID | The account identification number. | String |
| Account Location | The location of the account. | String |
| Active | Indicates whether the account is active. | Boolean |
| Agreement End Date | The end date of the agreement. | DateTime |
| Agreement ID | The identification number of the agreement. | String |
| Agreement Number | The number of the agreement. | String |
| Agreement Start Date | The starting calendar date of the agreement. | DateTime |
| Agreement Status | The status of the agreement. Possible values include: Under negotiation, Draft, Signed, Active, Rejected. | String |
| Agreement Type | The type of agreement. Possible values include: letter of understanding, Contract, Service Level Agreement. | String |
| Amendment | Indicates whether there is an amendment to the agreement. | String |
| Approved By | Indicates the person or organization approving the agreement by identification number. | String |
| Approved Date | The date on which the agreement was approved. | DateTime |
| Approver | Approver is the name of the approver associated with the Approved By identification number. | String |
| Bill Address | The billing address for the contract entity. | String |

TABLE 7-continued

| Attribute Name | Short Description | Type |
| --- | --- | --- |
| Bill Contact | The billing contact for the contract entity. | String |
| Customer Code | The customer code for the contract entity. | String |
| Contact | The customer contact for the contract entity. | String |
| Current Quota | The current quota for the contract entity. | String |
| Effective Date | The effective date for the contract entity. | DateTime |
| Joined Account ID | Joined Account ID is a technical parameter used to identify what other (if any) Account ID are referenced to this contract. | String |
| Legal Address | The legal address for the contract entity. | String |
| Legal Contact | The legal contact for the contract entity. | String |
| Parent Agreement ID | The parent agreement identification number. | String |
| Parent Agreement Name | The parent agreement name. | String |
| Project Information | Indicates project information for the contract entity. | String |
| Renewable | Indicates whether the agreement is renewable. | String |
| Revision Date | The date when the contract was last revised (same as Approved Date if the contract was never revised). | DateTime |
| Revision Number | The number of the revision. | String |
| Service Flag | Service Flag indicates whether a contract may be billed/invoiced yet or not. Possible values are: Y or N. | Boolean |
| Service Type | Service Type indicates how the contract should be billed/invoiced depending on the country where the products are made. | String |
| Ship Address | The shipping address for the contract entity. | String |
| Ship Contact | The shipping contact for the contract entity. | String |

The organization entity 214 is a business entity representing a partition of the customer base of the telecommunication service provider. The organization entity 214 may be used to manage business segmentation enabling the end to end management of a multi-organization environment having a logical partition of catalogues and subscriptions. Table 8 shows the attributes defining an organization entity 214.

TABLE 8

| Attribute Name | Short Description | Type | Additional Information |
| --- | --- | --- | --- |
| AddressID | Address ID. | String | The street address of the organization. |
| City | City name. | String | The city of the organization. |
| Country | Country code. | String | The country of the organization. |
| FaxNumber | FAX number. | String | The facsimile number of the organization. |
| PhoneNumber | Phone number. | String | The contact phone number for the organization. |
| Name | Organization name. | String | The name of the organization. |
| OrganizationCode | Organization code. | String | It identifies the Organization the Customer belongs to. Together with the Customer Code it gives a unique key to identify the customer account, and together with the Account Code it gives a unique key to identify the billing account. |
| OrganizationID | ID used to identify the organization. | String | N/A |
| PostalCode | ZIP code. | String | The ZIP code of the organization. |
| State | Province. | String | The state or province of the organization. |
| StreetAddress | Street name. | String | The street address for the organization. |

The address entity 216 is a business entity that represents the main address of a customer. The address entity 216 may have different meanings depending on one or more associated entities:

Customer address: is the legal address of the business customer or the fiscal address for a Residential customer;

Bill to address: is the address where the customer wants the telecommunication service provider to send the invoice for its postpaid product and services; and, Service address: for services that require this information, the service address is the location where the customer wants to use the service;

Table 9 shows the attributes of an address entity 216.

TABLE 9

| Attribute Name | Short Description | Type | Additional Information |
| --- | --- | --- | --- |
| ID | ID. | String | Used for a service order provisioning event. |
| PrimaryAddressId | Primary address ID. | String | Used for a service order provisioning event. |
| AddressNum | Street number. | String | N/A. |
| StreetType | Street type. | String | N/A. |
| City | City name. | String | N/A. |
| Country | Country code. | String | List of values with the name of selectable countries |
| ZIP | ZIP code | String | N/A. |
| State | Province | String | N/A. |
| Address | Street name. | String | N/A. |

With the data model 102, a billing profile entity 218 is a business entity that represents information used to generate an invoice. The billing profile entity 218 may contain information such as the payment method chosen by the customer, the media type selected for the invoice and all the possible parameters that facilitate the telecommunication service provider to provide the desired information in the invoice into the media channel selected by the customer. The billing profile entity 218 may further contain information such as the frequency of the bill, which may be configurable by the business organization or the customer. The attributes of a billing profile entity 218 are shown below in Table 10.

TABLE 10

| Attribute Name | Short Description | Type | Additional Information |
| --- | --- | --- | --- |
| BillFrequency | Bill Period (Quarterly, Monthly, or other periods). | String | If monthly, assign to next monthly bill cycle. |
| BillType | Bill Format (summarized, detailed). | String | N/A. |
| MediaType | Type of media for invoices (paper, email, or other media). | String | N/A. |
| PaymentMethod | Payment method (credit card, bank account, or other method). | String | N/A. |

A payment data entity 220 is a business entity that contain details about the payment method chosen by the payer. The payment data entity 220 may contain information relating to credit card data or bank account details. For example, the information may include the bank account number, the type of the bank account, the branch of the bank, the name of the bank, the first name of the main bank account/credit card owner, the fiscal number of the main bank account/credit card owner, or other information. Table 11 below shows the attributes for a payment data entity 220.

TABLE 11

| Attribute Name | Short Description | Type | Additional Information |
| --- | --- | --- | --- |
| BankAccountNumber | Number of the bank account. | String | Mandatory if payment method is Direct Debit, e.g.. Billing to validate to prevent a failure during billing. |
| BankAccountType | Type of the bank account. | String | This is the international CAB code. Mandatory if payment method is Direct Debit, e.g. bank. Billing to validate to prevent fail over during billing. |
| BankBranch | Branch of the bank. | String | Mandatory if payment method is Direct Debit, e.g. bank. Billing to validate to prevent a failure during billing. |
| BankName | Name of the bank. | String | Mandatory if payment method is Direct Debit, e.g. bank. Billing to validate to prevent a failure during billing. |
| PayerFirstName | First name of the main bank account/credit card owner. | String | Mandatory if payment method is not cash or check. |
| PayerLastName | Last name of the main bank account/credit card owner. | String | Mandatory if payment method is not cash or check. |
| PayerPersonalID | Fiscal number of the main bank account/credit card owner. | String | Mandatory if payment method is not cash. |
| CreditCardExpirationDate | Expiration date of the credit card. | String | Mandatory if payment method is credit card. Billing to validate to prevent a failure during billing. No validation required. |
| CreditCardNumber | Number of the credit card. | String | Mandatory if payment method is credit card. Billing to validate to prevent a failure during billing. No validation required. |
| CreditCardType | Type of the credit card. | String | This is a text field. For example: "VISA", "AMEX." Mandatory if payment method is credit card. Billing to validate to prevent a failure during billing. |

A refill entity 222 represents a refill request that a customer makes on a prepaid product or service. Table 12 shows the attributes for a refill entity 222.

TABLE 12

| Attribute Name | Short Description | Type | Additional Information |
| --- | --- | --- | --- |
| Channel | The channel used to make the refill (IVR, CRM, ATM). | String | N/A. |
| ScratchCardNumber | Number of the scratch card used for the refill. | String | N/A. |
| TransactionCode | Code of the refill transaction. | String | N/A. |
| Amount | Amount to refill on the account. | String | If refill is done by scratch card it's empty on receive. |
| RequestDate | Date of the refill. | String | N/A. |
| Currency | Currency used for the refill | String | N/A. |
| RefilledObjectId | For a prepaid product, this field contains the AssetIntegrationId. | String | N/A. |

The data model 102 also includes an adjustment entity 224. The adjustment entity 224 may be for a pre-paid adjustment or a post-paid adjustment. A pre-paid represents an adjustment performed on the balance of a pre-paid account. A post-paid represents an adjustment performed on the balance of a post paid account. The attributes for the adjustment entity 224 are shown below in Table 13.

TABLE 13

| Attribute Name | Short Description | Type | Additional Information |
| --- | --- | --- | --- |
| AdjustmentId | Code of the adjustment. | String | N/A. |
| CreatedByLogin | Operator's login that created the adjustment request. | String | N/A. |
| Description | Adjustment description. | String | N/A. |
| RequestReason | Reason of the adjustment request. | String | N/A. |
| Amount | Amount to be adjusted. | String | N/A. |
| RequestDate | Activation date of the adjustment. | String | N/A. |
| Status | Adjustment status. | String | Approved, pre-approved. |
| Type | Type of the adjustment (debit, credit). | String | N/A. |
| Currency | Currency used for the adjustment. | String | N/A. |
| AdjustedObjectId | For a prepaid product, this field contains the AssetIntegrationId. For a postpaid product, this field contains the InvoiceNumber. | String | N/A. |

Following will be described in detail the order and asset line item which are the instantiation of the catalogue layer entities.

The promotion entity 234 represents an encoding of an option to modify the offered price of bundles, offers, and products/services when a set of conditions are satisfied by a customer or billing account. Table 14 below describes an instance of a promotion entity 234.

TABLE 14

| Attribute Name | Short Description | Type | Additional Information |
| --- | --- | --- | --- |
| Promotion ID | Promotion unique identifier. | String | The Promition ID is the ID of the promotion assigned by CRM. This attribute may be used by a provisioning system or a billing system. |
| PromotionName | Promotion Name | String | Promotion Name is the name of the promotion assigned by CRM. This attribute may be used by a provisioning system or a billing system. |
| OrganizationCode | Unique identifier of the organization to which the customer belongs. | String | This attribute may be used by a billing system. |
| Commercial Start Date | Date from where the promotion may be commercialized. | String | N/A. |

TABLE 14-continued

| Attribute Name | Short Description | Type | Additional Information |
| --- | --- | --- | --- |
| Commercial End Date | Date from where the promotion may be commercialized. | String | N/A. |
| Promotion Duration | Duration of the promotion starting at Due Date. | String | N/A. |
| StartDate | The date when the product/service is started. | String | Recurring charge pro-rating is calculated based on this date. This attribute may be used by a provisioning system or a billing system. |
| EndDate | Termination date for product/service. | String | This attribute may be used by a provisioning system or a billing system. |
| DueDate | Date to have the product povisioned. | String | This attribute may be used by a provisioning system or a billing system. |
| CSR ID | Customer sales representative unique ID. | String | N/A. |
| SalesForceID | Sales force unique Identifier | String | This attribute may be used by a provisioning system or a billing system. |
| CustomerCode | Customer ID linked to the service order. | String | The customer identification related to the product/service. Same as SO level billing account ID. This attribute may be used by a provisioning system or a billing system. |
| BillingAccountCode | Unique identifier of the billing account. | String | This ID may be different from the billing account ID at the SO level. This is the attribute that may be used to sell the product to the billing account since it is the payer. This attribute may be used by a provisioning system or a billing system. |
| ActionCode | Action for the Service Element in the order. Includes: Disconnect, Add, Update. | String | Action code relating to the product. Billing to validate that Action code is not conflicting with SO action type. This attribute may be used by a provisioning system or a billing system. |
| Promotion InstanceId | Unique identifier for the promotion instance. This attribute may be used during the response to the CRM system at line item level in order to identify the right order item (an order is an instance of a product). | String | Unique identifier to identify a promotion instance. This may be used by a billing system to do any modification to an existing product instance. This field may be used by billing system. |
| LineNumber | It is a sequential number assigned to the each line item (a line item is an instance of a product). | String | This attribute may be used by a provisioning system or a billing system to avoid for a service order with all the children to process children product before their parent. |
| CRMOrderId | CRM Identifier of service order. | String | This attribute may be used by a provisioning system or a billing system. |
| Bundle ID | Top order of the service element hierarchy. | String | This attribute may be used by a provisioning system. |
| SOrderType | Type of the Service Order Includes: Add New Product, Modify, Disconnect. | String | This attribute may be used by a provisioning system or a billing system. |
| ServiceType | Type of the service. | String | This attribute may be used by a provisioning system or a billing system. |
| ActivationFlg | Flag used to discriminate if the product instance should be sent to the provisioning system. | String | This attribute may be used by a provisioning system and may be set to 'Y' |
| BillingFlg | Flag used to discriminate if the product instance should be sent to the billing system. | String | This attribute may be used by a provisioning system. |
| IntegrationId | For an asset, the integration ID is a key used by a billing system to identify an instance of a service that is already active. For and order item, the integration ID is a key to identify an instance of a service for an account. | String | This attribute may be used by a provisioning system or a billing system. |
| Status | Asset/order status. | String | This attribute may be used by a billing system. Possible values for asset are: active inactive Possible values for order are: pending open |

TABLE 14-continued

| Attribute Name | Short Description | Type | Additional Information |
|---|---|---|---|
| | | | installed/failed/partially completed complete |
| Price List ID | Contains the CRM Price List ID. It is used by both ServiceOrderProvisioning and AssetComponent BE. | String | This attribute may be used by a billing system. |

The bundle entity 236 facilitates aggregating several offer entities and/or product/service entities with a price that is less of the sum of the charge of each bundle component.

Table 15 below describes an instance of the bundle entity 236.

TABLE 15

| Attribute Name | Short Description | Type | Additional Information |
|---|---|---|---|
| Bundle ID | Bundle unique identifier. | String | It is the ID of the promotion assigned by CRM. This attribute may be used by a provisioning system or a billing system. |
| Bundle Name | Bundle name. | string | It is the name of the promotion assigned by CRM. This attribute may be used by a provisioning system or a billing system. |
| Organization Code | Unique identifier of the organization to which the customer belongs. | String | This attribute may be used by a billing system. |
| Commercial Start Date | Date from where the Promotion may be commercialized. | String | N/A. |
| Commercial EndDate | Date from where the Bundle may be commercialized. | String | N/A. |
| Bundle Duration | Duration of the Bundle starting by Due Date. | String | N/A. |
| StartDate | The date when the product/service is started. | String | Recurring charge pro-rating is calculated based on this date. This attribute may be used by a provisioning system or a billing system. |
| EndDate | Termination date for product/service. | String | This attribute may be used by a provisioning system or a billing system. |
| DueDate | Date to have the product provisioned. | String | This attribute may be used by a provisioning system or a billing system. |
| CSR ID | Customer Sales Representative unique ID | String | N/A. |
| SalesForceID | Sales Force unique identifier. | String | This attribute may be used by a provisioning system or a billing system. |
| CustomerCode | Customer ID linked to the service order. | String | The customer identification related to the product/service. Same as SO level billing account ID. This attribute may be used by a provisioning system or a billing system. |
| BillingAccountCode | Unique identifier of the billing account. | String | This ID may be different from the billing account ID at the SO level. This is the attribute that may be used to sell the product to the billing account since it is the payer. This attribute may be used by a provisioning system or a billing system. |
| ActionCode | Action for the Service Element in the order. Includes: Disconnect, Add, Update. | String | Action code relating to the product. Billing to validate that Action code is not conflicting with SO action type. This attribute may be used by a provisioning system or a billing system. |
| Bundle InstanceId | Unique identifier for the bundle instance. This attribute may be used during the response to the CRM system at line item level in order to identify the right order item (an order is an instance of a product). | String | Unique identifier to identify a bundle instance. This may be used by a billing system to do any modification to an existing product instance. This field may be used by billing system. |
| LineNumber | It is a sequential number assigned to the each line | String | This attribute may be used by a provisioning system or a billing system to avoid for a service order with all |

TABLE 15-continued

| Attribute Name | Short Description | Type | Additional Information |
| --- | --- | --- | --- |
| | item (a line item is an instance of a product). | | the children to process children product before their parent. |
| CRMOrderId | CRM Identifier of a service order. | String | This attribute may be used by a provisioning system or a billing system. |
| Bundle Parent ID | Top order of the service element hierarchy. | String | This attribute may be used by a provisioning system. |
| Promotion ID | Promotion unique identifier. | String | It is the ID of the promotion assigned by CRM. This attribute may be used by a provisioning system or a billing system. |
| ServiceId | In a CRM system, a generic service may be configured that is a line service to which a line number is associated as its "service ID" attribute value (event source). | String | Event Source. An event source may be: the apparent CLI (Calling Line Identifier) for a telephone call. the MSISDN for all the services being part of a GSM subscription. the login of the subscriber for all the services being part of triple-play subscription. This attribute may be used by a provisioning system or a billing system. |
| SOrderType | Type of the Service Order. Includes: Add New Product, Modify, Disconnect. | String | This attribute may be used by a provisioning system or a billing system. |
| ServiceType | Type of the service. | String | This attribute may be used by a provisioning system or a billing system. |
| ActivationFlg | Flag used to discriminate if the product instance should be sent to the provisioning system. | String | This attribute may be used by a provisioning system and may be set to 'Y' |
| BillingFlg | Flag used to discriminate if the product instance should be sent to the billing system. | String | This attribute may be used by a provisioning system. |
| IntegrationId | For an asset, the integration ID is a key used by a billing system to identify an instance of a service that is already active. For and order item, the integration ID is a key to identify an instance of a service for an account. | String | This attribute may be used by a provisioning system or a billing system. |
| Status | Asset/order status. | String | This attribute may be used by a billing system. Possible values for asset are: active inactive Possible values for order are: pending open installed/failed/partially completed complete |
| Price List ID | Contains the CRM price list ID. It is used by both ServiceOrderProvisioning and AssetComponent BE. | String | This attribute may be used by a billing system. |

The offer entity 230 aggregates products/services with a price that is less of the sum of the charge of each offer component. The offer entity 230 includes information about the offer, the actions that the provisioning and billing systems may perform and their status tracking. In general, the products and services managed by a telecommunication service provider represent items that are sold to customers. The products and services result in fees or discounts accrued by a billing account. A product may be associated with a set of required parameters used to uniquely distinguish the product from the End-to-End perspective, such as a product identifier and a price list identifier). Product data may contain additional parameters used to implement special business logics; for example the "Organization ID" used for the end-to-end management of a multi-organization environment that means having catalogues and subscriptions partitioned.

Table 16 below describes an instance of the offer entity 230.

TABLE 16

| Attribute Name | Short Description | Type | Additional Information |
| --- | --- | --- | --- |
| Offer ID | Offer unique identifier. | String | It is the ID of the offer assigned by CRM. This attribute may be used by a provisioning system or a billing system. |
| Offer Name | Offer name. | String | It is the name of the offer assigned by CRM. This attribute may be used by a provisioning system or a billing system. |
| Organization Code | Unique identifier of the organization to which the customer belongs. | String | This attribute may be used by a billing system. |
| Commercial Start Date | Date from where the promotion can be commercialized. | String | N/A. |
| Commercial End Date | Date from where the promotion can be commercialized. | String | N/A. |
| Offer Duration | Duration of the offer starting by Due Date | String | N/A. |
| StartDateb | The date when the product/service is started. | String | Recurring charge pro-rating is calculated based on this date. This attribute may be used by a provisioning system or a billing system. |
| EndDate | Termination date for product/service. | String | This attribute may be used by a provisioning system or a billing system. |
| DueDate | Date when the product is to be provisioned. | String | This attribute may be used by a provisioning system or a billing system. |
| CSR ID | Customer sales representative unique ID. | String | N/A. |
| SalesForceID | Sales force unique identifier. | String | This attribute may be used by a provisioning system or a billing system. |
| CustomerCode | Customer ID linked to the service order. | String | The customer identification related to the product/service. Same as SO level billing account ID. This attribute may be used by a provisioning system or a billing system. |
| BillingAccountCode | Unique identifier for the billing account | String | This ID may be different from the billing account ID at the SO level. This is the attribute that may be used to sell the product to the billing account since it is the payer. This attribute may be used by a provisioning system or a billing system. |
| ActionCode | Action for the Service Element in the order. Includes: Disconnect, Add, Update. | String | Action code relating to the product. Billing to validate that Action code is not conflicting with SO action type. This attribute may be used by a provisioning system or a billing system. |
| Offer InstanceId | Unique identifier for the offer instance. This attribute may be used during the response to the CRM system at line item level in order to identify the right order item (an order is an instance of a product). | String | Unique identifier to identify an offer instance. This may be used by a billing system to do any modification to an existing product instance. This field may be used by billing system. |
| LineNumber | It is a sequential number assigned to the each line item (a line item is an instance of a product). | String | This attribute may be used by a provisioning system or a billing system to avoid for a service order with all the children to process children product before their parent. |
| CRMOrderId | CRM Identifier of service order. | String | This attribute may be used by a provisioning system or a billing system. |

TABLE 16-continued

| Attribute Name | Short Description | Type | Additional Information |
|---|---|---|---|
| Bundle ID | Bundle unique identifier. | String | It is the ID of the promotion assigned by CRM.<br>This attribute may be used by a provisioning system or a billing system. |
| Promotion ID | Promotion unique identifier. | String | It is the ID of the promotion assigned by CRM.<br>This attribute may be used by a provisioning system or a billing system. |
| ServiceId | In a CRM system, a generic service may be configured that is a line service to which a line number is associated as its "service ID" attribute value (event source). | String | Event Source. An event source may be:<br>the apparent CLI (Calling Line Identifier) for a telephone call.<br>the MSISDN for all the services being part of a GSM subscription.<br>the login of the subscriber for all the services being part of triple-play subscription.<br>This attribute may be used by a provisioning system or a billing system. |
| SOrderType | Type of the Service Order. Includes: Add New Product, Modify, Disconnect. | String | This attribute may be used by a provisioning system or a billing system. |
| ServiceType | Type of the service. | String | This attribute may be used by a provisioning system or a billing system. |
| ActivationFlg | Flag used to discriminate if the product instance should be sent to the provisioning system. | String | This attribute may be used by a provisioning system and may be set to 'Y'. |
| BillingFlg | Flag used to discriminate if the product instance should be sent to the billing system. | String | This attribute may be used by a provisioning system. |
| IntegrationId | For an asset, the integration ID is a key used by a billing system to identify an instance of a service that is already active.<br>For and order item, the integration ID is a key to identify an instance of a service for an account. | String | This attribute may be used by a provisioning system or a billing system. |
| Status | Asset/order status. | String | This attribute may be used by a billing system.<br>Possible values for asset are:<br>active<br>inactive<br>Possible values for order are:<br>pending<br>open<br>installed/failed/partially completed<br>complete |
| Price List ID | Contains the CRM Price List ID.<br>It is used by both ServiceOrderProvisioning and AssetComponent BE. | String | This attribute may be used by a billing system. |

Table 17 below describes an instance of the product/service offering entity 228.

TABLE 17

| Attribute Name | Short Description | Type | Additional Information |
|---|---|---|---|
| Product ID | Product/Service unique identifier. | String | It is the ID of the product/service assigned by CRM.<br>This attribute may be used by a provisioning system or a billing system. |
| ProductName | Name of the product/servce. | String | It is the name of the product/service.<br>Product Name may be assigned by a CRM system.<br>This attribute may be used by a provisioning system or a billing system. |

TABLE 17-continued

| Attribute Name | Short Description | Type | Additional Information |
| --- | --- | --- | --- |
| Organization Code | Unique identifier of the organization to which the customer belongs. | String | This attribute may be used by a billing system. |
| ProductInstanceId | Unique identifier for the Product instance. This attribute may be used during the response to the CRM system at line item level in order to identify the right order item (an order is an instance of a product). | String | Unique identifier to identify a product instance. This may be used by a billing system to do any modification to an existing product instance.<br>This field may be used by billing system. |
| ActionCode | Action for the Service Element in the order. Includes: Disconnect, Add, Update. | String | Action code relating to the product.<br>Billing to validate that Action code is not conflicting with SO action type.<br>This attribute may be used by a provisioning system or a billing system. |
| StartDate | The date when the product/service is started. | String | Recurring charge pro-rating is calculated based on this date.<br>This attribute may be used by a provisioning system or a billing system. |
| EndDate | Termination date for product/service. | String | This attribute may be used by a provisioning system or a billing system. |
| DueDate | Date to have the product provisioned | String | This attribute may be used by a provisioning system or a billing system. |
| Product/Service Duration | Duration of the subscription starting by Due Date | String | This attribute may be used by a provisioning system or a billing system. |
| ModifyDate | Date when a modification to a line item has occurred. | String | This attribute may be used by a provisioning system or a billing system. |
| CustomerCode | Customer ID linked to the service order. | String | The customer identification related to the product/service.<br>Same as SO level billing account ID.<br>This attribute may be used by a provisioning system or a billing system. |
| BillingAccountCode | Unique identifier for the billing account. | String | This ID may be different from the billing account ID at the SO level. This is the attribute that may be used to sell the product to the billing account since it is the payer.<br>This attribute may be used by a provisioning system or a billing system. |
| LineNumber | It is a sequential number assigned to the each line item (a line item is an instance of a product). | String | This attribute may be used by a provisioning system or a billing system to avoid for a service order with all the children to process children product before their parent. |
| CRMOrderId | CRM Identifier of the Service Order. | String | This attribute may be used by a provisioning system or a billing system. |
| ParentOrderItemId | Unique identifier for parent order of the hierarchy. | String | This attribute may be used by a provisioning system. |
| RootOrderItemId | Top order of the service element hierarchy. | String | This attribute may be used by a provisioning system. |
| ServiceAccountDesc | Name of the service account associated to the product/service. | String | This attribute may be used by a provisioning system. |
| ServiceAccountId | Unique identifier of the service account associated to the product/service. | String | This attribute may be used by a provisioning system. |
| ServiceId | In a CRM system, a generic service may be configured that is a line service to which a line number is associated as its "service ID" attribute value (event source). | String | Event Source. An event source may be:<br>the apparent CLI (Calling Line Identifier) for a telephone call.<br>the MSISDN for all the services being part of a GSM subscription.<br>the login of the subscriber for all the services being part of triple-play subscription.<br>This attribute may be used by a provisioning system or a billing system. |
| SOrderType | Type of the service order. Includes: Add New Product, Modify, Disconnect, etc. | String | This attribute may be used by a provisioning system or a billing system. |
| ParentProductId | Unique identifier for parent product of the hierarchy (unique key). | String | This attribute may be used by a billing system. |

TABLE 17-continued

| Attribute Name | Short Description | Type | Additional Information |
| --- | --- | --- | --- |
| Bundle ID | Bundle unique identifier. | String | It is the ID of the promotion assigned by CRM. This attribute may be used by a provisioning system or a billing system. |
| Offer ID | Offer unique identifier. | String | It is the ID of the offer assigned by CRM. This attribute may be used by a provisioning system or a billing system. |
| Promotion ID | Promotion unique identifier. | String | It is the ID of the promotion assigned by CRM. This attribute may be used by a provisioning system or a billing system. |
| TopProductId | Top product of the service element hierarchy (unique key). | String | This attribute may be used by a billing system. |
| SalesForceID | Sales force unique identifier. | String | This attribute may be used by a provisioning system or a billing system. |
| ServiceType | Type of the service. | String | This attribute may be used by a provisioning system or a billing system. |
| ActivationFlg | Flag used to discriminate if the product instance should be sent to the provisioning system. | String | This attribute may be used by a provisioning system and may be set to 'Y'. |
| BillingFlg | Flag used to discriminate if the product instance should be sent to the billing system. | String | This attribute may be used by a provisioning system. |
| IntegrationId | For an asset, the integration ID is a key used by a billing system to identify an instance of a service that is already active. For and order item, the integration ID is a key to identify an instance of a service for an account. | String | This attribute may be used by a provisioning system or a billing system. |
| Status | Asset/order status. | String | This attribute may be used by a billing system. Possible values for asset are: active inactive Possible values for order are: pending open installed/failed/partially completed complete |
| Price List ID | Contains the CRM Price List ID. It is used by both ServiceOrderProvisioning and AssetComponent BE. | String | This attribute may be used by a billing system. |
| Charge | Consequence of the price list ID as default; may be overridden. | String | N/A. |
| PrimaryUserContact | UserContact entities. | String | N/A. |

The product/service attribute entity 232 is a business entity related to the product/service offering entity 228. The product/service attribute entity 232 contains additional parameters defining the product/service offering entity 228, which may be used to implement special business logics. The product/service attribute entity 232 may also have other information about the way a product is priced or configured. Table 18 below defines the attributes for a product/service attribute entity 232.

TABLE 18

| Attribute Name | Short Description | Type | Additional Information |
| --- | --- | --- | --- |
| ActionCode | Action for the attribute in the order. Includes: Disconnect, Add, Update. | String | May be "Add", "Delete" or "Modify". This attribute tells the back-end system what action to perform on the attribute. |
| ParentId | ID of the parent entity. Unique identifier of the product instance in a CRM system. | String | For asset component, the ParentID may be the Asset ID. For SO provisioning, the ParentID may be the Object ID. |
| Name | ID of the attribute Includes: Tariff and Product. | String | ListofValue. ListofValue depends on the product catalogue that may be defined according to the product catalogue. |

TABLE 18-continued

| Attribute Name | Short Description | Type | Additional Information |
| --- | --- | --- | --- |
| Value | Value of the attribute. (depends on the attribute). | String | N/A. |

A price list entity 226 together with a product identifier defines the price of the sellable one or many products and services eventually bundled. The attributes for a price list entity 226 are shown below in Table 19.

TABLE 19

| Attribute Name | Short Description | Type |
| --- | --- | --- |
| Price List ID | Unique Identifier (ID) of the product pricing model | String |
| Currency Code | Id of the currency used for the Price List | Integer |
| Name | Name of the price list | String |
| Start Date | Price list start date validity | DateTime |
| End Date | Expiration date for the price list. | DateTime |
| Organization ID | Organization that can use the price list | String |
| Payment Method | Details of payment method | String |
| Charge Type | Recurring, Initiation, Termination, Suspension, | String |

An order aggregation entity 238 groups the information related to products, services, offers and promotions a customer may purchase. The order aggregation entity 238 may also collect general information about the order. General information may include customer information, billing account information, the order type, or other information. An order aggregation entity 238 may include the aggregation of order item entities 242 to represent all the products purchased by a customer and their configured attributes. Table 20 below illustrates the attributes of an order aggregation entity 238.

TABLE 20

| Attribute Name | Description | Type | Additional Information |
| --- | --- | --- | --- |
| CustomerCode | Customer foreign key to the service order. | String | The customer code may be unique for all systems. The customer code may be 10 digits: the first digit from the Organization Code, and the last two digits are 00 and the other are generated in sequence, e.g., 1XXXXXXX00. |
| BillingAccountCode | Billing account foreign key to the service order. | String | An account code may be unique for all systems and is linked to Customer Code. In one implementation, it is 10 digits: the first 8 digit are equal to customer code digits, while the last two digits vary from 01 to 99 1XXXXXXXnn. |
| OrderDate | Date of the order. | String | Date when the order is submitted. |
| OrderId | Unique identifier for the service order. | String | Unique identifier for the order. |
| OrderPriority | Priority of the service order. | String | N/A. |
| OldOrderId | Old order ID. | String | Old Order ID for SI transfer |
| OrganizationCode | | String | OrganizationCode identifies the Organization to which the Customer belongs. Together with the Customer Code it gives a unique key to identify the customer account, and together with the Account Code it gives a unique key to identify the billing account. |
| SOStatus | Status of the service order. | String | N/A. |
| ActionType | Order type code. | String | SO type (New, Modify, Disconnect). |
| SalesForceID | Sales force unique Identifier. | String | N/A. |
| OrderSubType | "Transfer" order type. | String | An order type to identity the order is for SI transfer. |

With the data model 102, an asset entity 240 represents an instantiation of the product subscribed by a customer. Similarly, an attribute instance entity 244 represents an instantiation of the product/service attribute entity 232 associated with the asset entity 240 subscribed by the customer. The attribute instance entity 244 has attributes similar to the attributes of a product/service attribute entity 232, and the asset entity 240 has attributes similar to the attributes of a product/service offering entity 228. The asset entity 240 may further be an asset entity that represents the available products, the installed services, and active discounts and offers purchased with an order by the customer.

An order item entity 242 models the bundles, offers, products, services, discounts and the promotions selected by a customer in an order. An order item entity 242 may also contain technical service parameters needed to fulfill the order from a provisioning point of view. These parameters may provide the customer with the availability of the desired configured services. In one implementation, an order item entity 242 has similar attributes as a product/service offering entity 228

An event source entity 246 represents the guiding parameter for the service usage identification in the network. The event source entity 246 provides information as to the services for which the customers pay based on the usage. In one implementation, an event source entity 246 uses a subset of the attributes of the order item entity 242, which may also be similar to the attributes of an asset entity 240. From a physical data model point of view, the data model 102 may reuse the structure of the order item entity 242 for the event source entity 246.

A service order response entity 248 is an acknowledgment sent from a provisioning enterprise application to a customer relation management enterprise application to notify that an order has been fulfilled. Table 21 shows the attributes for a service order response entity 248.

TABLE 21

| Attribute Name | Short Description | Type | Additional Information |
| --- | --- | --- | --- |
| OrderId | Unique Identifier for the service order. | String | Unique identifier for the order. |
| ActivationDate | Activation date. | String | Timestamp for the service activation. This may be populated by a provisioning system. |
| Status | Service order status. | String | Provides information about the result of a service order activation request. |
| BackOfficeErrorText | Error text. | String | Additional text for custom messages for a customer relation management application.. |
| CustomerCode | Customer identification. | String | The customer code may be unique for all systems. The customer code may be 10 digits: the first digit from the Organization Code, and the last two digits are 00 and the other are generated in sequence, e.g., 1XXXXXXX00. |
| SerialNumber | Identifier of the item. | String | May be used where there is a service order provisioning response at the item level and it contains the identifier of the provisioned item. Where there is a service order at the order level, this attribute is not used. |

An order item response entity 250 encodes a notification for a customer relation management system 106 that an order item has been provisioned or activated. For example, the order item response entity 250 may notify the customer relation management system 106 that an ASDL service has been activated for a customer and that the customer may use the ASDL service. Table 22 shows the attributes for the order item response entity 250.

TABLE 22

| Attribute Name | Short Description | Type | Additional Information |
| --- | --- | --- | --- |
| OrderItemID | Unique Identifier for the ordered item. | String | Unique identifier for the order. |
| ActivationDate | Activation date. | String | Timestamp for the date of provisioning or activating the order item. This may be populated by a provisioning system. |
| Status | Service order status. | String | Provides information about the result of provisioning or activating an order item. |
| ErrorText | Error text. | String | Additional text for custom messages for a customer relation management application.. |
| SerialNumber | Identifier of the item. | String | Provides the serial number of the provisioned order item. |

There may also be exceptions in the data model 102. Table 23 lists possible exceptions that may occur when using the data model 102. Other exceptions are also possible.

TABLE 23

| Field | Short Description | Type |
|---|---|---|
| ErroreventId | Unique ID identifying the event. | Number |
| CustomerId | Customer ID of the subscriber. | String |
| NumberOfErrors | This is the number of errors which are correlated with the same BusinessEventInstanceID. | Number |
| FlagError | If true, the record represents an error otherwise there is not an error. | Number |
| FlagSolved | Indicates if the error has been solved. (Currently this flag is always set to 0). | Number |
| TargetSystemId | Target System which generates the error. | Number |
| BusinessEventSd | Business Event which generates the error. | Number |
| BusinessEventInstanceId | Unique identifier identifying the message. | String |
| OrchestrationId | Instance ID of the orchestration that generated the exception. | String |
| MessageId | Message ID. | String |
| DataXml | XML message failed. | String |
| ErrorTargetSystemCode | Original Error Code thrown by the target system. | String |
| ErrorTargetSystemDesc | Original Error Description. | String |
| ErrorSysCode | System Error Code. | String |
| ErrorSysDesc | System Error Description. | String |
| ErrorArchCode | Architectural Error Code. | String |
| ErrorArchDesc | Architectural Error Description. | String |
| ErrorStack | Stack Frame of the error occurred. | String |
| Severity | Error severity. | Number |
| ErrorTime | Date time of the error. | Date |
| NumberOfEntries | Number of times that the message has been resent. | Number |
| IsResent | Indicates if the message is being resent or not. | Number |
| IsResendable | Indicates if it is resendable or not. | Number |
| InsertTime | Date time of the insert. | Date |
| LastUpdateTime | Date time of the last update. | Date |

Figure 3:
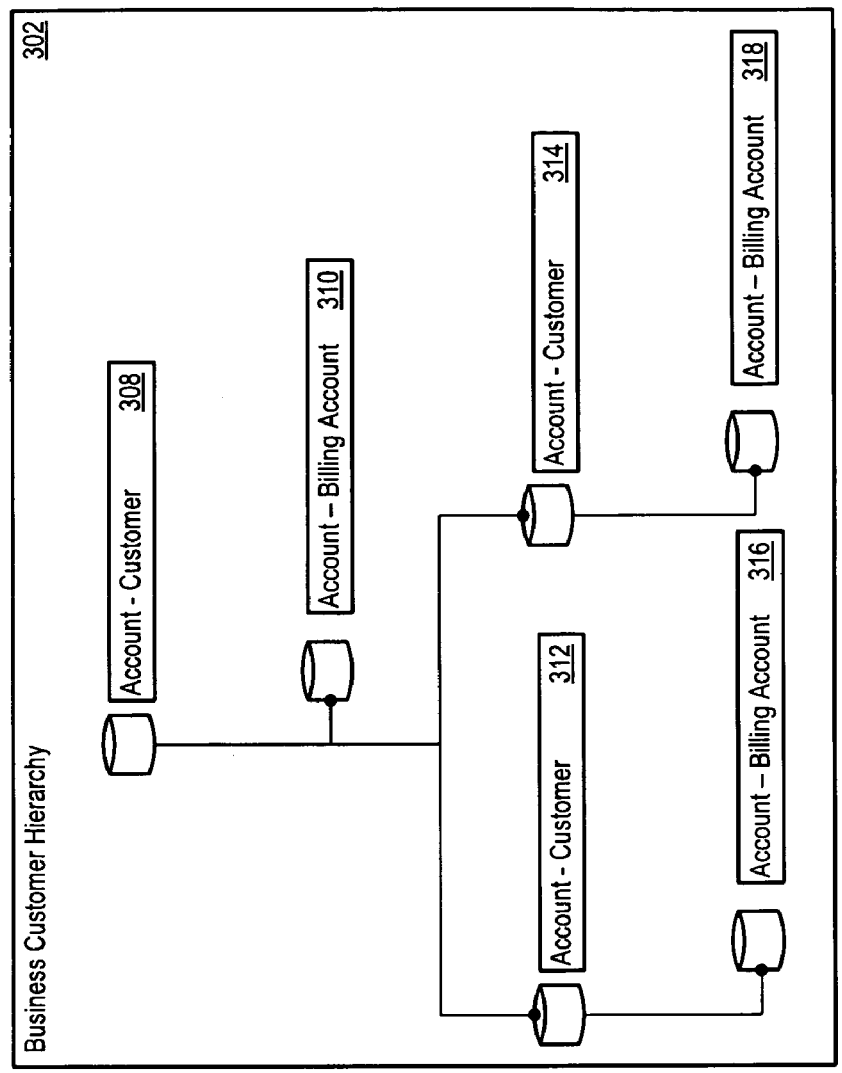
FIG. 3 shows a residential and a business customer hierarchy derived from the data model.
Figure 3:
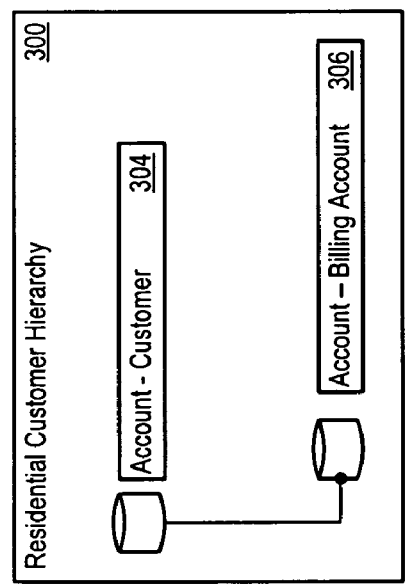

FIG. 3 shows a residential hierarchy 300 and a business customer hierarchy 302 derived from the data model 102. The residential hierarchy 300 includes a customer account 304 with a corresponding billing account 306. In contrast, the business hierarchy 302 illustrates that a business customer account 308 may have a corresponding a billing account 310, and multiple customer accounts 312-314, each having their own billing account 316-318. In one implementation of the data model 102, a customer may be an individual or a company who purchases products and services while billing accounts are entities invoiced by the billing system. A customer may correspond to a single billing account or the customer may spread purchases into several billing accounts, such that each billing account differs from each other according to their specific information such as payment data, credit classes, the account contact and address, or other information. The customer and billing account hierarchy defined by the data model 102 allows a telecommunication service provider to manage complex customer structures and invoicing requirements.

Figure 4:
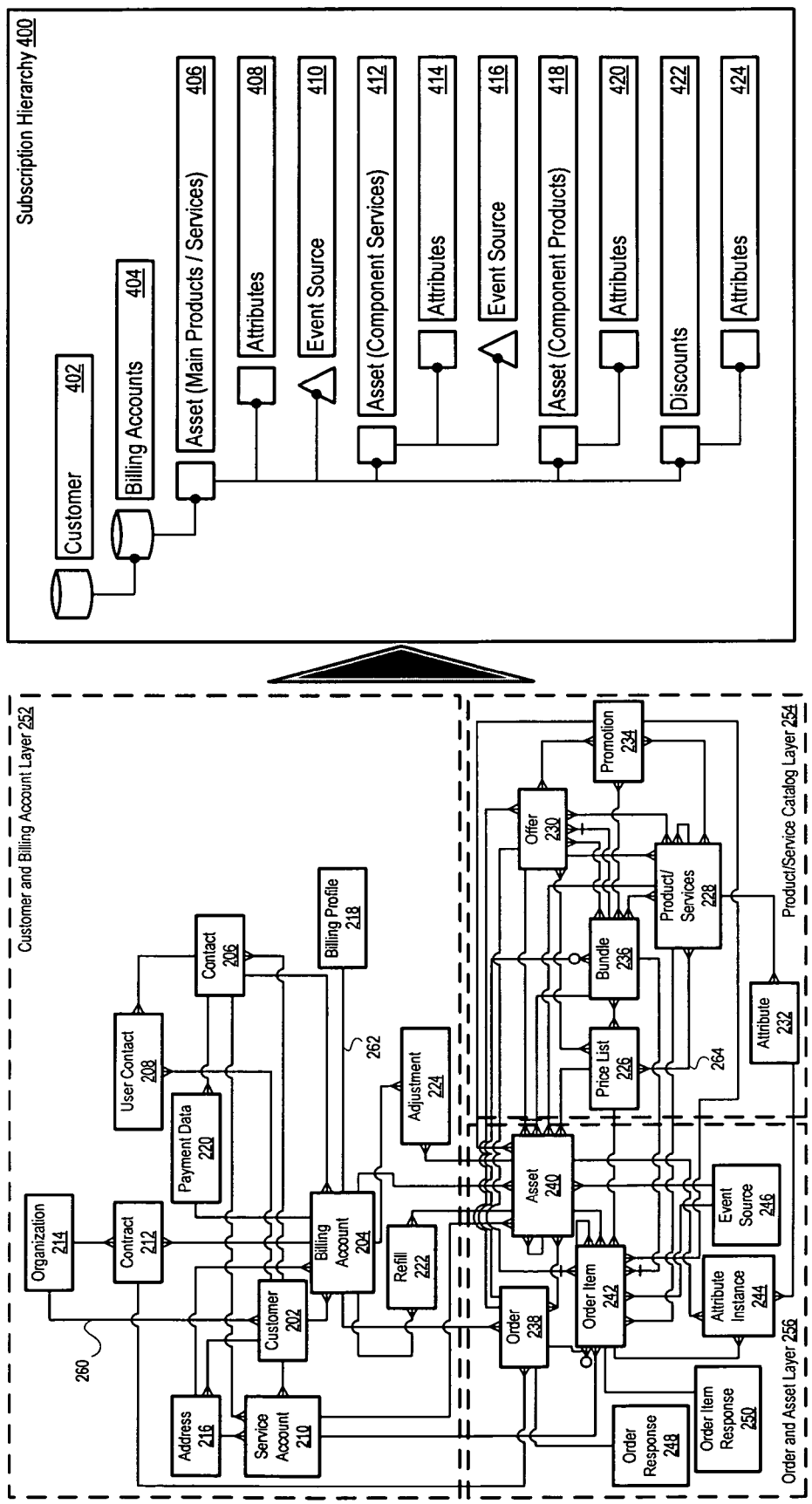
FIG. 4 shows a subscription traced in the entity relationship diagram shown in FIG. 2.

FIG. 4 shows a subscription hierarchy 400 traced in the entity relationship diagram 200 shown in FIG. 2. The subscription hierarchy 400 begins with a customer 402, which corresponds to a customer entity 202. The customer 402 may include one or more billing accounts 404. The billing accounts 404 of the subscription hierarchy 400 correspond to the billing account entity 204 of the data model 102. The billing accounts 404 may include one or more main products and/or services 406, and one or more component services 412 and component products 418. The billing accounts 404 may also have included discounts 422. The main products and/or services 406, the component services 412, and component products 418, may be further defined by one or more attributes 408/414/420/424. The main product and/or service 406 may include an event source identifier 410, which corresponds to an event source entity 246 of the data model 102. Similarly, the component services 412 may also include an event source identifier 416. Other hierarchies are also possible using the data model 102.

Figure 5:
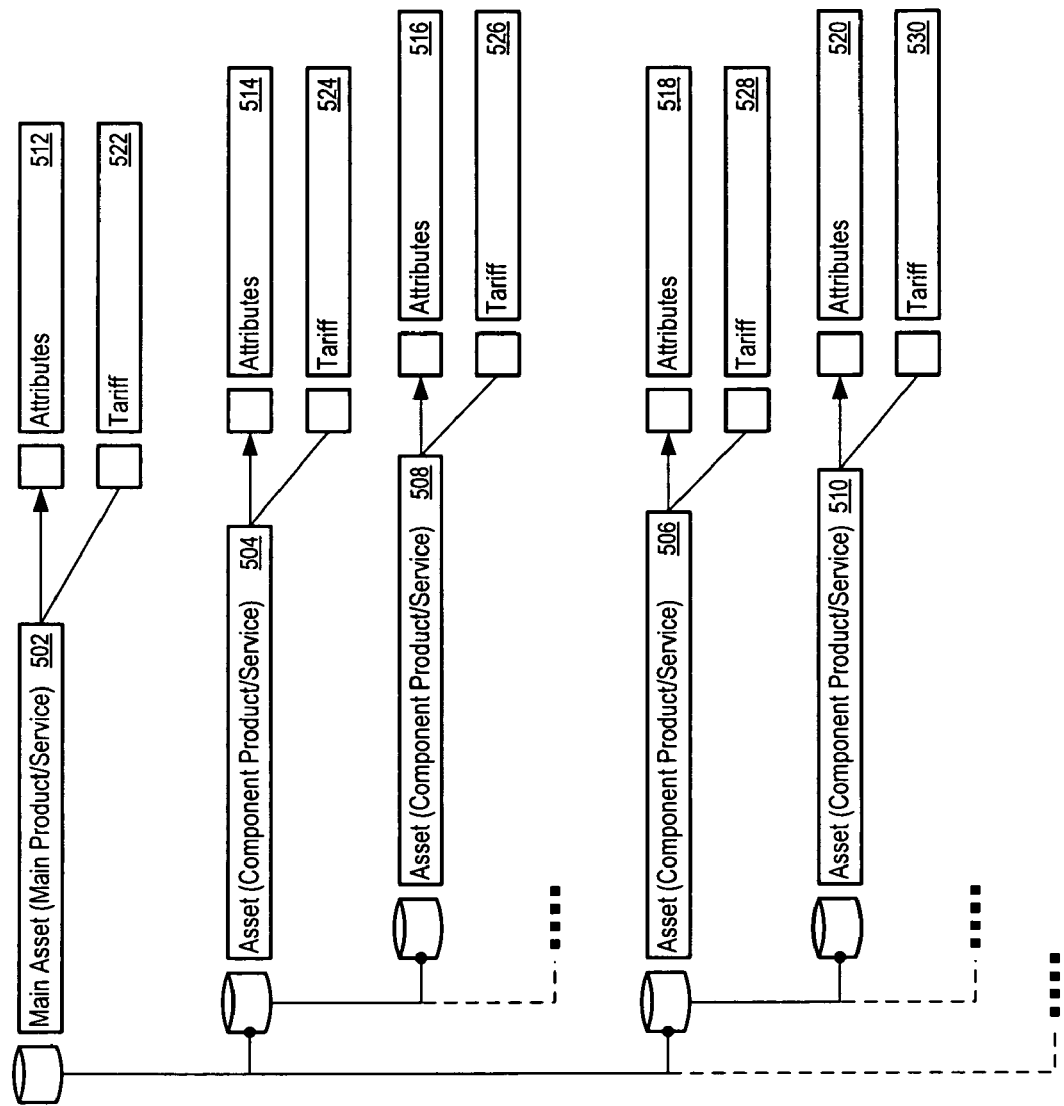
FIG. 5 shows a hierarchical representation of the subscription (hierarchical structure of product and service instance or installed asset) shown in FIG. 4.

FIG. 5 shows a hierarchical representation of the subscription 500 shown in FIG. 4. Using the data model 102, a complex market offering may be easily modeled through a hierarchy of components 502-510, where each of the components 502-510 are identified by a specific set of attributes 512-520 and tariff 522-530 details. The products and services hierarchy helps a telecommunication service provider to manage complex product structures, bundles, price lists and discounts within a unique standard framework.

Figure 6:
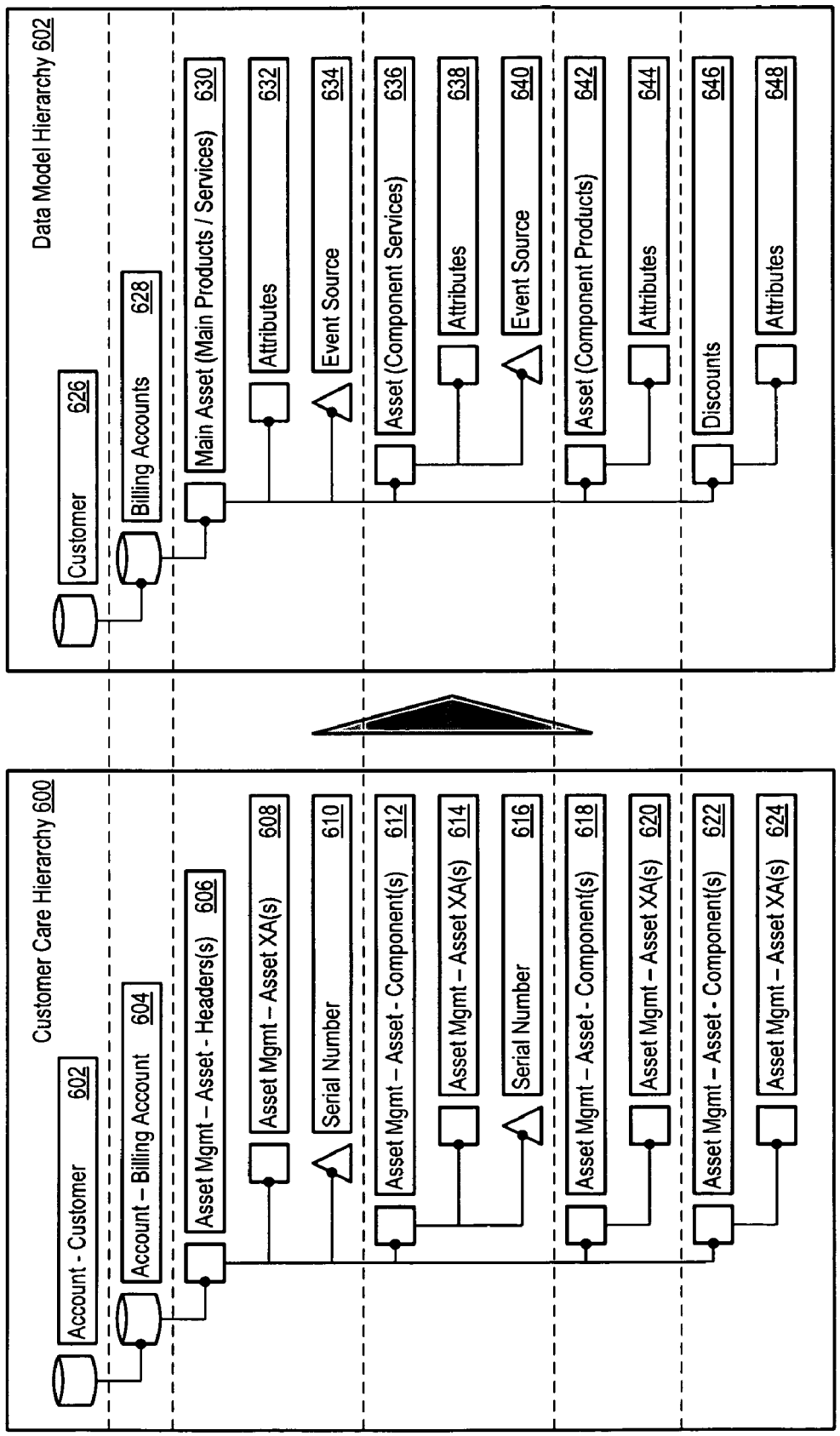
FIG. 6 shows a customer care hierarchy mapped from an implementation specific customer care system to a customer relationship hierarchy build on the data model.

FIG. 6 shows a customer care hierarchy 600 mapped from an implementation specific customer care system to a customer relationship hierarchy consistent with the data model 102. Each of the entities 602-624 of a customer care relation system may be mapped to one or more entities 626-648 of the data model 102. For example, a customer account 602 of the customer care relation system may be mapped to a customer entity 626 of the data model 102. Sub-entities, such as asset components 612/618/622 may be similarly mapped to entities 636/642/646 of the data model 102. As shown in FIG. 6, the mapping may be on a one-to-one basis. However, alternative mappings are also possible.

Figure 7:
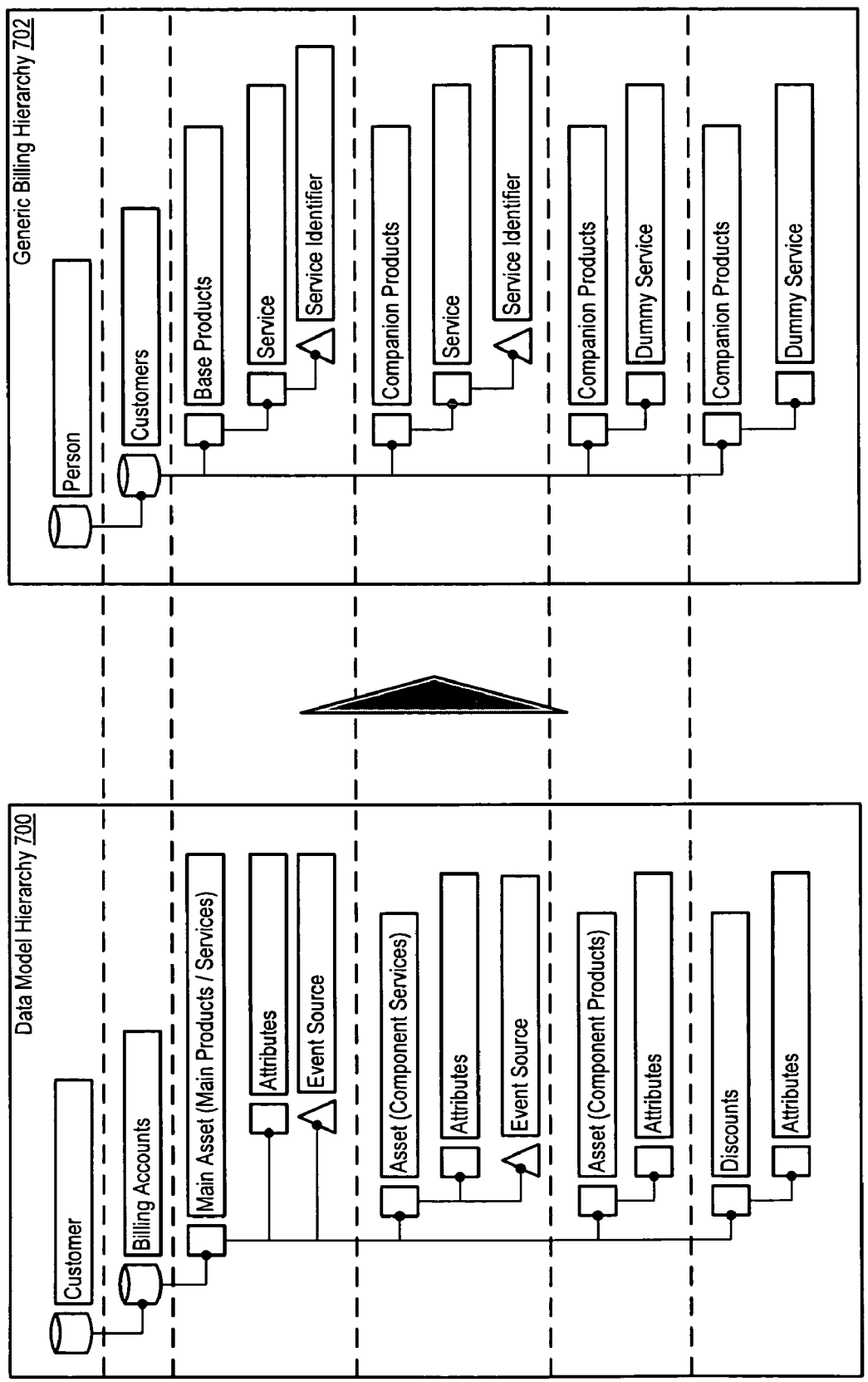
FIG. 7 shows a billing hierarchy built on the data model mapped to a multi-purpose billing hierarchy that need not adhere to the data model.
Figure 8:
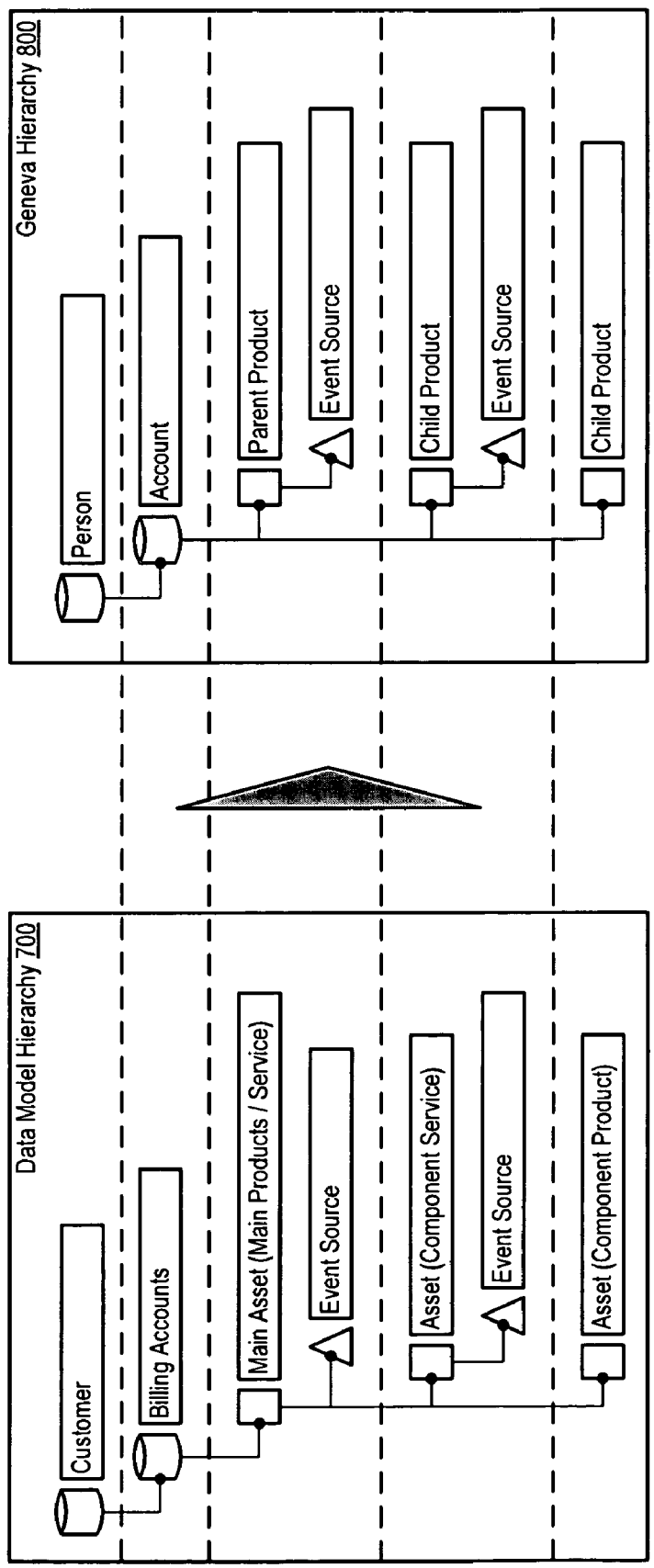
FIG. 8 shows a billing hierarchy built on the data model mapped to an implementation specific billing hierarchy for a first specific billing support system.
Figure 9:
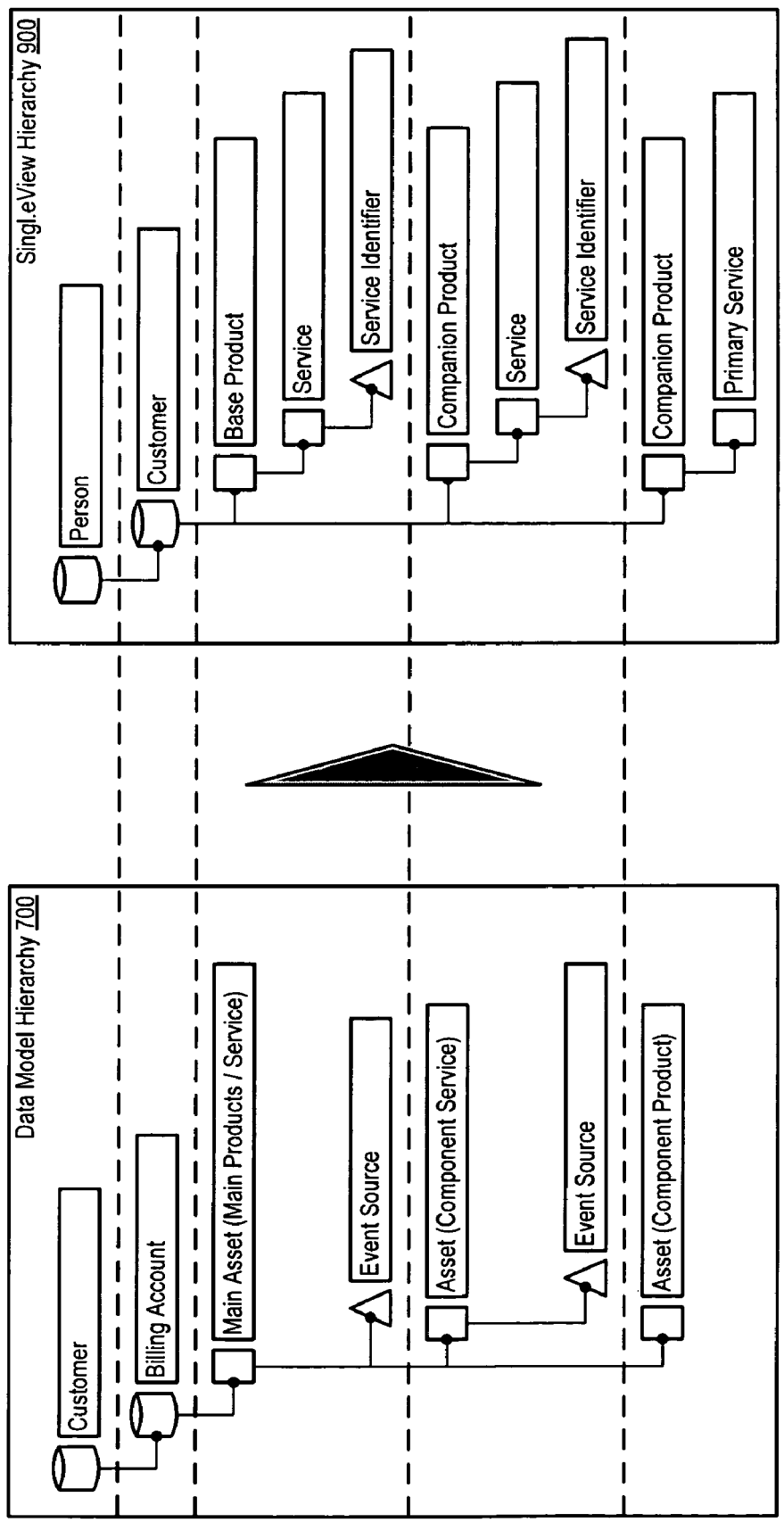
FIG. 9 shows a billing hierarchy built on the data model mapped to an implementation specific billing hierarchy for a second specific billing support system.
Figure 10:
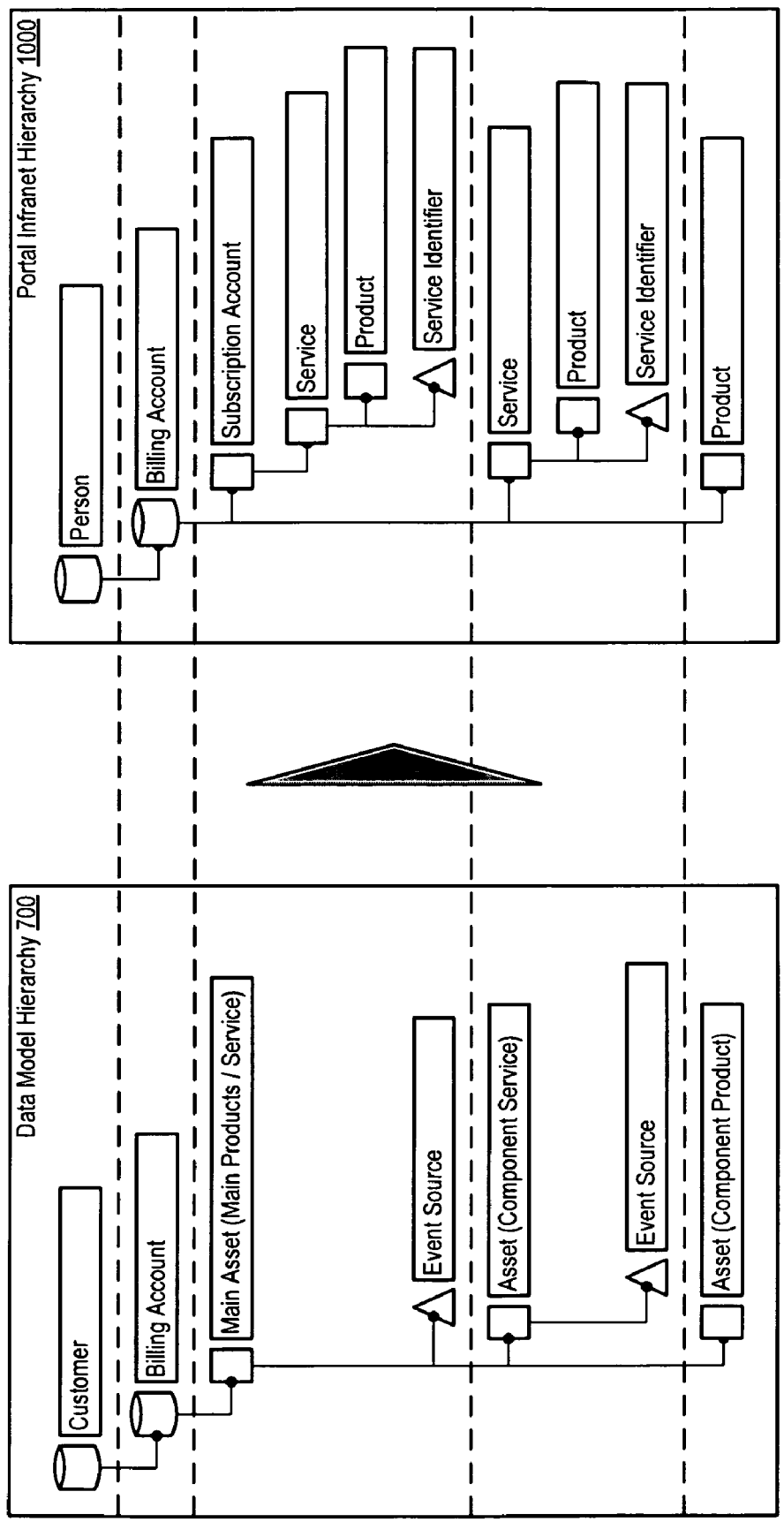
FIG. 10 shows a billing hierarchy built on the data model mapped to an implementation specific billing hierarchy for a third specific billing support system.

The data model 102 also allows the flexibility for integrating multiple different types of enterprise applications. For example, the data model 102 allows for the integration of multiple different types of billing systems. FIG. 7 shows a billing hierarchy 700 built on the data model 102 mapped to a multi-purpose billing hierarchy 702 that need not adhere to the data model 102. FIG. 8 shows a billing hierarchy 800 built on the data model 102 mapped to an implementation specific billing hierarchy for a first specific billing support system 802. FIG. 9 shows a billing hierarchy 700 mapped to an implementation specific billing hierarchy for a second specific billing support system 900. FIG. 10 shows the billing hierarchy 700 mapped to an implementation specific billing hierarchy for a third specific billing support system 1000. As may be seen from FIGS. 7-10, the data model 102 is flexible to integrate additional billing systems that may or may not share the same billing structure. Accordingly, the data model 102 is universally applicable to a wide range of enterprise applications.

Figure 11:
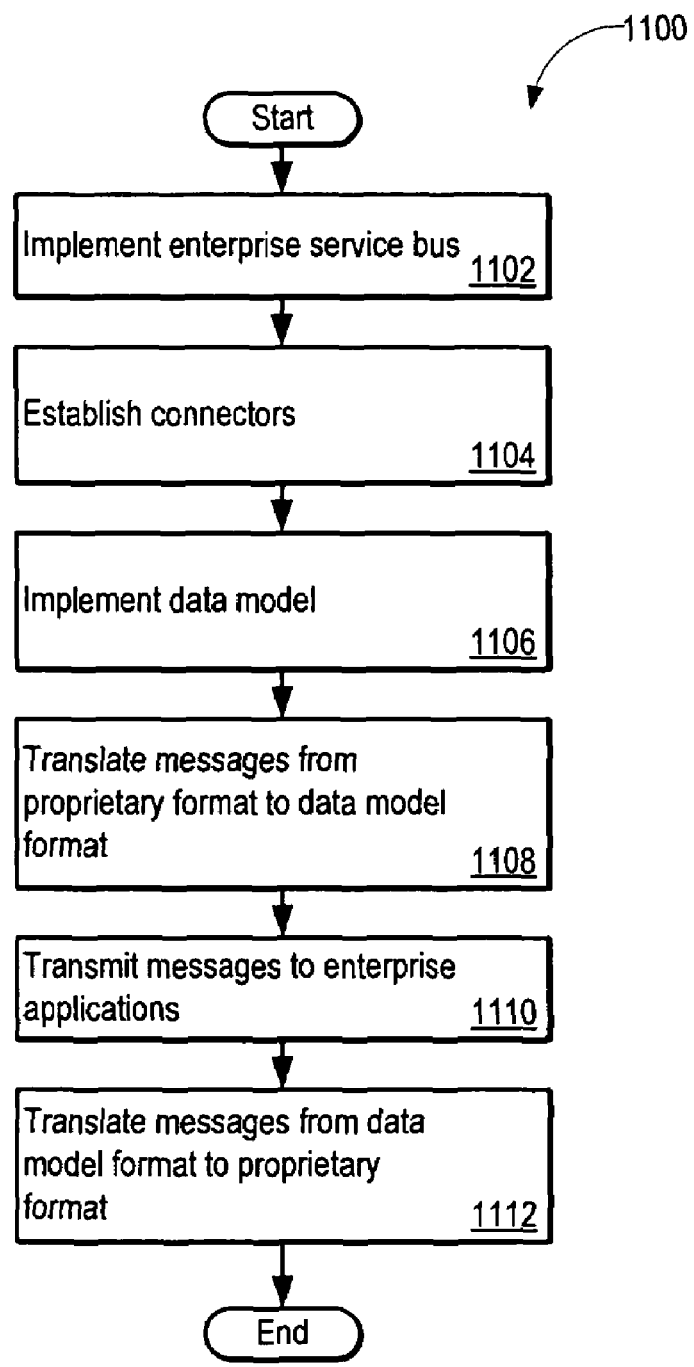
FIG. 11 shows a flow diagram for configuring a telecommunication service provider architecture in which multiple support systems interoperate to provide telecommunication products and services to customers.

FIG. 11 shows a flow diagram 1100 for configuring a telecommunication service provider architecture in which multiple support systems interoperate to provide telecommunication products and services to customers. Initially, the telecommunication service provider establishes an enterprise service bus 104 for routing telecommunication product and service messages (1102). The telecommunication service provider may then establish connectors 112-116 through which the multiple support systems 106-110 connect to the enterprise service bus 104 (1104). The telecommunication service provider then implements the data model 102 previously described (1108), including the entities 202-224 of the customer and billing account layer 252, the entities 226-236 of the product/service catalog layer 254, and the entities 238-250 of the order and asset layer 256. Enterprise applications may then be connected to the enterprise service bus 104, where one or more entities from the enterprise applications are translated from a proprietary format to the data model format (1108). The entities encoded in to the data model format are then passed between the enterprise applications (1110). Finally, entities encoded in the data model format are then translated into the proprietary format of the receiving/subscribing enterprise application. (1112).

As previously discussed, the data model 102 is derived from intensive research and is consistent with industry standards. The data model 102 helps to "future-proof" telecommunication service provider architecture and is not anchored to the specific technology or a specific software package. The adoption of the data model 102 by different enterprise applications facilitates an easy and streamlined integration of different software components into an overall architecture allowing application package independence.

The data model 102 helps a telecommunication service provider achieve the following technical benefits:

Reduced Investment Risk: Although a telecommunication service provider may have its own requirements there are basic capabilities that are common across telecommunication service providers. The reusability of experiences in a form of already defined business entities and data modeling decision reduce the probability of downfall projects and decrease the overall risk negative returns on investments.

Speed Up Time to Market: The data model 102 leads to quicker project completion and a faster time-to-benefit as already taken and proven design decisions drastically reduce the implementation time effort.

Know How and Quality: The data model 102 represents the culmination of almost 300 man-years of experience in service oriented architecture packaged into a pre-defined shared and reusable data model relationship representation that may be applied to support core processes of any telecommunications service provider. The data model 102 has a unique technological realization as a universally applicable data model for telecommunications service providers. Furthermore, the data model 102 is agnostic of any underlying technology that a telecommunication service provider may select.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A method for configuring a telecommunication service provider architecture in which multiple support systems interoperate to provide telecommunication products and services to customers, the method comprising:
    establishing an enterprise service bus for routing telecommunication customer, product and service messages;
    establishing connectors through which the multiple support systems connect to the enterprise service bus in order to publish and subscribe those messages; and
    implementing across the enterprise service bus and connectors an object entity model comprising:
        a customer and billing account layer comprising:
            an organization entity encoding a partition of a customer base into multiple organizations that customers may belong to;
            a customer entity encoding the legal entity who purchase offered products and services;
            a contract entity encoding service agreements between the telecommunication service provider and the customers;
            an address entity encoding addresses for the customers;
            a billing account entity encoding the entity who is invoiced as a consequence of the purchase and the usage of the offered products and services;
            a billing profile entity encoding invoice generation information for the billing account related to the customers;
            a payment data entity encoding payment parameters selected by the customers;
            a service account entity encoding provisioning location information for the offered products and services;
            a contact entity encoding contact information for the customers;
            a user contact entity encoding contact information for a user of the offered products and services purchased by the customer;
            a refill entity encoding a refill request that a customer makes on a prepaid product or service; and,
            an adjustment entity encoding a pre-paid adjustment or a post-paid adjustment;
        an order and asset layer comprising:
            order aggregation entity encoding aggregations of ordered products and services;
            an asset entity encoding instantiations of the ordered products and services
            an order item entity encoding technical service parameters for provisioning the ordered products and services
            an attribute instance entity encoding instantiations of product attributes for the ordered products and services;
            an event source entity encoding service usage identification for pay-by-use customers;
            a service order response entity encoding an acknowledgment that an order has been fulfilled; and,
            an order item response entity encoding a notice that an order item has been provisioned or activated; and, a product/service catalog layer comprising:
  a promotion entity encoding a promotion that applies to bundle, offers, products and services, and that modifies their price for a specified period;
  a bundle entity encoding bundles of offers, products, and services, and that modifies their price for a specified period;
  an offer entity encoding a set of products and services, and that modifies their price for a specified period;
  a product/service offering entity encoding the offered products and services offered to the customers;
  a price list entity encoding bundle, offer, product and service prices for the offered products and services;
  an offer price entity encoding market prices for the offered products and services; and,
  a product/service attribute entity encoding supplemental parameters for implementing the offered products and services.

2. The method of claim 1, where implementing the object entity model further comprises:
  implementing individual one-to-many relationships from:
    the customer entity to the billing account entity;
    the customer entity to the contact entity;
    the customer entity to the address entity;
    the customer entity to the service account entity;
    the customer entity to the user contact entity;
    the billing account entity to the refill entity;
    the billing account entity to the adjustment entity;
    the billing account entity to the asset entity;
    the billing account entity to the order aggregation entity;
    the billing account entity to the contract entity;
    the contact entity to the billing account entity;
    the contact entity to the service account entity;
    the contact entity to the payment data entity;
    the contact entity to the user contact entity;
    the service account entity to the order item entity;
    the service account entity to the asset entity; and,
    the contract entity to the order aggregation entity.

3. The method of claim 2, where implementing the object entity model further comprises:
  implementing individual one-to-many relationships from:
    the organization entity to the customer entity;
    the organization entity to the contract entity;
    the address entity to the service account entity; and,
    the address entity to the billing account entity.

4. The method of claim 3, where implementing the object entity model further comprises:
  implementing individual one-to-one relationships from:
    the billing account entity to the billing profile entity; and,
    the billing account entity to the payment data entity.

5. The method of claim 1, where implementing the object entity model further comprises:
  implementing individual one-to-many relationships from:
    the price list entity to the asset entity;
    the price list entity to the order item entity;
    the product/service offering entity to the asset entity;
    the product/service offering entity to the product/service attribute entity;
    the product/service offering entity to the order item entity;
    the offer price entity to the order item entity;
    the offer price entity to the asset entity;
    the offer price entity to the product/service offering entity;
    the product/service attribute entity to the attribute instance entity;
    the promotion entity to the order item entity;
    the promotion entity to the asset entity;
    the bundle entity to the offer price entity;
    the bundle entity to the asset entity; and,
    the bundle entity to the order item entity.

6. The method of claim 5, where implementing the object entity model further comprises:
  implementing individual many-to-many relationships from:
    the price list entity to the bundle entity;
    the price list entity to the offer price entity;
    the price list entity to the product/service offering entity;
    the product/service offering entity to the bundle entity;
    the product/service offering entity to the promotion entity;
    the product/service offering entity to the offer price entity;
    the offer price entity to the promotion entity;
    the offer price entity to the bundle entity; and,
    the promotion entity to the bundle entity.

7. The method of claim 1, where implementing the object entity model further comprises:
  implementing individual one-to-many relationships from:
    the order aggregation entity to the offer price entity;
    the order aggregation entity to the bundle entity;
    the order aggregation entity to the order item entity;
    the asset entity to the refill entity;
    the asset entity to the adjustment entity;
    the asset entity to the attribute instance entity;
    the asset entity to the order item entity;
    the order item entity to the attribute instance entity;
    the event source entity to the order item entity; and,
    the event source entity to the asset entity.

8. The method of claim 7, where implementing the object entity model further comprises:
  implementing an individual many-to-many relationship from the order aggregation entity to the asset entity.

9. The method of claim 8, where implementing the object entity model further comprises:
  implementing individual one-to-one relationships from:
    the order aggregation entity to the service order response entity; and,
    the order item entity to the order item response entity.

10. A reusable telecommunications architecture comprising:
  an enterprise service bus for routing telecommunication customer, product and service messages;
  connectors through which multiple support systems connect to the enterprise service bus; and
  an object entity model implemented across the enterprise service bus and connectors, the object entity model comprising:
    a customer and billing account layer comprising:
      an organization entity encoding a partition of a customer base into multiple organizations that customers may belong to;
      a customer entity encoding the legal entity who purchase offered products and services;
      a contract entity encoding service agreements between the telecommunication service provider and the customers;
      an address entity encoding addresses for the customers;
      a billing account entity encoding the entity who is invoiced as a consequence of the purchase and the usage of the offered products and services;

a billing profile entity encoding invoice generation information for the billing account related to the customers;
a payment data entity encoding payment parameters selected by the customers;
a service account entity encoding provisioning location information for the offered products and services;
a contact entity encoding contact information for the customers;
a user contact entity encoding contact information for a user of the offered products and services purchased by the customer;
a refill entity encoding a refill request that a customer makes on a prepaid product or service; and,
an adjustment entity encoding a pre-paid adjustment or a post-paid adjustment;
an order and asset layer comprising:
order aggregation entity encoding aggregations of ordered products and services;
an asset entity encoding instantiations of the ordered products and services
an order item entity encoding technical service parameters for provisioning the ordered products and services
an attribute instance entity encoding instantiations of product attributes for the ordered products and services;
an event source entity encoding service usage identification for pay-by-use customers;
a service order response entity encoding an acknowledgment that an order has been fulfilled; and,
an order item response entity encoding a notice that an order item has been provisioned or activated; and,
a product/service catalog layer comprising:
a promotion entity encoding a promotion that applies to bundle, offers, products and services, and that modifies their price for a specified period;
a bundle entity encoding bundles of offers, products, and services, and that modifies their price for a specified period;
an offer entity encoding a set of products and services, and that modifies their price for a specified period;
a product/service offering entity encoding the offered products and services offered to the customers;
a price list entity encoding bundle, offer, product and service prices for the offered products and services;
an offer price entity encoding market prices for the offered products and services; and,
a product/service attribute entity encoding supplemental parameters for implementing the offered products and services.

11. The reusable telecommunications architecture of claim 10, where the object entity model further comprises:
individual one-to-many relationships from:
the customer entity to the billing account entity;
the customer entity to the contact entity;
the customer entity to the address entity;
the customer entity to the service account entity;
the customer entity to the user contact entity;
the billing account entity to the refill entity;
the billing account entity to the adjustment entity;
the billing account entity to the asset entity;
the billing account entity to the order aggregation entity;
the billing account entity to the contract entity;
the contact entity to the billing account entity;
the contact entity to the service account entity;
the contact entity to the payment data entity;
the contact entity to the user contact entity;
the service account entity to the order item entity;
the service account entity to the asset entity; and,
the contract entity to the order aggregation entity.

12. The reusable telecommunications architecture of claim 11, where the object entity model further comprises:
individual one-to-many relationships from:
the organization entity to the customer entity;
the organization entity to the contract entity;
the address entity to the service account entity; and,
the address entity to the billing account entity.

13. The reusable telecommunications architecture of claim 12, where the object entity model further comprises:
individual one-to-one relationships from:
the billing account entity to the billing profile entity; and,
the billing account entity to the payment data entity.

14. The reusable telecommunications architecture claim 10, where the object entity model further comprises:
individual one-to-many relationships from:
the price list entity to the asset entity;
the price list entity to the order item entity;
the product/service offering entity to the asset entity;
the product/service offering entity to the product/service attribute entity;
the product/service offering entity to the order item entity;
the offer price entity to the order item entity;
the offer price entity to the asset entity;
the offer price entity to the product/service offering entity;
the product/service attribute entity to the attribute instance entity;
the promotion entity to the order item entity;
the promotion entity to the asset entity;
the bundle entity to the offer price entity;
the bundle entity to the asset entity; and,
the bundle entity to the order item entity.

15. The reusable telecommunications architecture of claim 14, where the object entity model further comprises:
individual many-to-many relationships from:
the price list entity to the bundle entity;
the price list entity to the offer price entity;
the price list entity to the product/service offering entity;
the product/service offering entity to the bundle entity;
the product/service offering entity to the promotion entity;
the product/service offering entity to the offer price entity;
the offer price entity to the promotion entity;
the offer price entity to the bundle entity; and,
the promotion entity to the bundle entity.

16. The reusable telecommunications architecture of claim 10, where the object entity model further comprises:
individual one-to-many relationships from:
the order aggregation entity to the offer price entity;
the order aggregation entity to the bundle entity;
the order aggregation entity to the order item entity;
the asset entity to the refill entity;
the asset entity to the adjustment entity;
the asset entity to the attribute instance entity;
the asset entity to the order item entity;
the order item entity to the attribute instance entity;
the event source entity to the order item entity; and,
the event source entity to the asset entity.

17. The reusable telecommunications architecture of claim 16, where the object entity model further comprises:
an individual many-to-many relationship from the order aggregation entity to the asset entity.

18. The reusable telecommunications architecture of claim 16, where the object entity model further comprises: individual one-to-one relationships from:
the order aggregation entity to the service order response entity; and,
the order item entity to the order item response entity.

* * * * *